United States Patent
Harding et al.

(10) Patent No.: US 11,151,660 B1
(45) Date of Patent: *Oct. 19, 2021

(54) INTELLIGENT ROUTING CONTROL

(71) Applicant: Progressive Casualty Insurance Company, Mayfield Village, OH (US)

(72) Inventors: Jarrod D. Harding, Mayfield Village, OH (US); Jeremy Esteves, Mayfield Village, OH (US); Todd Makrucki, Mayfield Village, OH (US); Kanwar Kohli, Mayfield Village, OH (US)

(73) Assignee: PROGRESSIVE CASUALTY INSURANCE COMPANY, Mayfield Village, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/133,449

(22) Filed: Dec. 23, 2020

Related U.S. Application Data

(63) Continuation-in-part of application No. 16/874,521, filed on May 14, 2020, which is a continuation of application No. 16/374,480, filed on Apr. 3, 2019, now Pat. No. 10,657,603.

(51) Int. Cl.
*G06F 16/11* (2019.01)
*G06Q 40/08* (2012.01)
*G06F 16/93* (2019.01)
*G06F 7/14* (2006.01)
*G06N 20/00* (2019.01)

(52) U.S. Cl.
CPC ............... *G06Q 40/08* (2013.01); *G06F 7/14* (2013.01); *G06F 16/116* (2019.01); *G06F 16/93* (2019.01); *G06N 20/00* (2019.01)

(58) Field of Classification Search
CPC ....................................................... G06F 16/93
See application file for complete search history.

(56) References Cited

U.S. PATENT DOCUMENTS

| 2008/0168135 A1* | 7/2008 | Redlich | G06F 21/6218 709/204 |
| 2009/0116746 A1* | 5/2009 | Neogi | G06K 9/00442 382/190 |
| 2011/0282921 A1* | 11/2011 | Dodge | H04L 67/06 707/822 |

(Continued)

*Primary Examiner* — Mohammad S Rostami
(74) *Attorney, Agent, or Firm* — Lempia Summerfield Katz LLC

(57) ABSTRACT

A system and method classify insurance documents. The system and method access documents from an assessment queue stored in a memory where each of the documents have a predefined destination stored in metadata. The system and method remove the metadata associated with each document and covert the documents into single physical page documents by splitting each of the of documents into files, consisting essentially of a single physical page. The system and method convert each of the files into separate recognition vectors and classify the files through an additive learning algorithm in which routing data is embedded in second metadata associated with the files. The system and method merge the files, route the files to predefined destinations stored in the metadata, and process insurance documents automatically in response to the routing of the merged documents.

30 Claims, 18 Drawing Sheets

(56) References Cited

U.S. PATENT DOCUMENTS

| | | | | |
|---|---|---|---|---|
| 2014/0229407 A1* | 8/2014 | White | ............... | G06Q 10/10 |
| | | | | 706/12 |
| 2016/0055413 A1* | 2/2016 | Popov | ............ | G06K 9/00469 |
| | | | | 706/55 |
| 2016/0071017 A1* | 3/2016 | Adjaoute | ........... | G06N 20/00 |
| | | | | 706/52 |
| 2017/0026543 A1* | 1/2017 | Tahiliani | ........... | G06F 16/358 |
| 2017/0346828 A1* | 11/2017 | Lorensson | ......... | G06F 40/103 |
| 2018/0012137 A1* | 1/2018 | Wright | ............... | G05B 15/02 |
| 2018/0067957 A1* | 3/2018 | Paterson | ............. | G06F 16/13 |
| 2018/0232526 A1* | 8/2018 | Reid | ................. | H04L 9/3271 |
| 2019/0349426 A1* | 11/2019 | Smith | ................ | H04L 45/20 |

\* cited by examiner

Selection/ Rejection of coverage

If you do not want "Stacked Uninsured Motorists" coverage equal to your bodily injury limits, you must select one of the options below. You may select Uninsured Motorist coverage limits up to the Bodily injury liability limits in your policy or you may reject Uninsured Motorist coverage entirely. If you do not reject Uninsured Motorist coverage entirely you may select "Stacked Uninsured Motorist" or "Non-stacked Uninsured Motorist."

Please select one coverage option below and a limit if issued under that chapter.

- ☐ I want Stacked Uninsured Motorist coverage in the same limits as my Bodily Injury liability coverage. (Note if you select this option the first paragraph of this from shall not apply.)
- ☐ I want Non-stacked uninsured Motorist coverage in the same limits as my Bodily injury liability coverage.
- ☐ I want Stacked Uninsured Motorist coverage at the limits selected below.
    - ☐ $10,000/$20,000
    - ☐ $25,000/$50,000
    - ☐ $50,000/$100,000
    - ☐ $100,000/$200,000
    - ☐ $250,000/$500,000
    - ☐ $100,000 Combined Single Limits
    - ☐ $300,000 Combined Single Limits
- ☐ I want Non-Standard Uninsured Motorist coverage at the limits selected below.
    - ☐ $10,000/$20,000
    - ☐ $25,000/$50,000
    - ☐ $50,000/$100,000
    - ☐ $100,000/$200,000
    - ☐ $250,000/$500,000
    - ☐ $100,000 Combined Single Limits
    - ☐ $300,000 Combined Single Limits
- ☒ I reject all Uninsured Motorist Coverage.

I understand and agree that this selection of the option above applies to my liability insurance policy, and will apply to any renewals or replacement of such policy that are issued with the same Bodily Injury Liability Limits as this policy. If I decide to request a change to my selection, the change will not become effective until the company receives your selection under this form and it has been completed and signed.

Signature of named Insured      Date

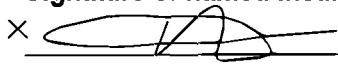

```
┌─────────────────────────────────────────────────────────────────────┐
│ ◢ ─────── Notepad                                           _  □    │
│ File  Edit  Format  View  Help                                      │
│ Dec.26_2017 10:53 AIMI Apple Insurance Agency 88888888   P 2/ 2     │
│ Policy Number: 99999999                                             │
│ AL PHANSO EVANS                                                     │
│ Page2 of 2                                                          │
│                                                                     │
│ Selection/rejection of coverage                                     │
│                                                                     │
│ If you do not want "Stacked Uninsured Motorists" coverage equal to  │
│ your bodily injury liability limits, you must select one of         │
│                                                                     │
│ the options below. You may select Uninsured Motorist coverage       │
│ limits up to the Bodily injury liability limits in your policy      │
│                                                                     │
│ or you may reject Uninsured Motorist coverage entirely. If you do   │
│ not reject Uninsured Motorist coverage entirely you may             │
│ select "Stacked Uninsured Motorist" or "Non-stacked Uninsured Motorist." │
│                                                                     │
│ Please select one coverage option below and a limit if listed under │
│ that option.                                                        │
│                                                                     │
│ [:1] I want Stacked Unlimited Motorist coverage in the same limits  │
│ as my Bodily Injury liability                                       │
│ coverage.                                                           │
│ (Note: If you select this option the first paragraph of this form   │
│ shall not apply.)                                                   │
│                                                                     │
│ A [:1] I want Non-stacked Uninsured Motorist coverage in the same   │
│ limits as my Bodily Injury                                          │
│ liability                                                           │
│ coverage.                                                           │
│                                                                     │
│ D "WantStacked" or ------------------------------------------------ │
│ 33510000520000                                                      │
│ E35250001500000                                                     │
│ ----------------------                                              │
│ ----------------------                                              │
│ ----------------------                                              │
│ -------------------                                                 │
│ ----------------------                                              │
│ ---------------------------------------                             │
└─────────────────────────────────────────────────────────────────────┘
```

FIG. 9B

FLORIDA UNINSURED MOTORIST COVERAGE SELECTION/REJECTION FORM

YOU ARE ELECTING NOT TO PURCHASE CERTAIN VALUABLE COVERAGE WHICH PROTECTS YOU AND YOUR FAMILY OR YOU ARE PURCHASING UNINSURED MOTORIST LIMITS LESS THAN YOUR BODILY INJURY LIABILITY LIMITS WHEN YOU SIGN THIS FORM. PLEASE READ CAREFULLY.

Description of coverage

Uninsured Motorist coverage provides for payment of certain benefits for damages caused by owners or operators of uninsured motor vehicles because of bodily injury or death resulting therefrom. Such benefits may include payments for certain medical expenses, lost wages, and pain and suffering, subject to limitations and conditions contained in the policy. For the purpose of this coverage, an uninsured motor vehicle may include a motor vehicle as to which the bodily injury limits are less than your damages.

Florida law requires that motor vehicle liability policies include Uninsured Motorist coverage limits equal to the Bodily Injury Liability limits in your policy unless you select lower limits offered by the company or reject Uninsured Motorist coverage entirely. If you are interested in selecting Uninsured Motorist coverage for limits less than your Bodily Injury Liability limits, or are rejecting this coverage entirely, you must complete and sign the appropriate option below.

If you decide to purchase any Uninsured Motorist coverage you can select either Stacked Uninsured Motorist coverage or Non-stacked Uninsured Motorist coverage. The cost of Non-stacked Uninsured Motorist coverage is lower than the cost of Stacked Uninsured Motorist coverage.

If you select Stacked Uninsured Motorist coverage and you or a family member who resides with you is injured by an uninsured motorist, your policy limits for each motor vehicle listed on the policy may be added together to determine the total amount that may be recovered (stacked) for all covered injuries. Thus, the limits available to you would automatically change during the policy period if you increase or decrease the number of motor vehicles covered under the policy.

If you select Non-stacked Uninsured Motorist coverage and you or a family member who resides with you is injured by an uninsured motorist, the injured person may not add or combine the coverage provided as to two or more motor vehicles together to determine the limits of uninsured motorist insurance coverage available, except as described in subsection one below. The injured person is limited to the coverage available as to that motor vehicle he or she was occupying if injured in an accident while occupying a vehicle listed on the policy. Non-stacked Uninsured Motorist coverage is also subject to the following limitations:

1. If the injured person is occupying a motor vehicle not owned by the injured person or a family member who resides with him or her, the injured person may elect the coverage on the motor vehicle occupied and the highest limits of coverage afforded for any one vehicle insured by the injured person or any family member who resides with him or her. Such coverage shall be excess over Uninsured Motorist coverage on the vehicle the injured person is occupying.
2. If the named insured or family member who resides with him or her is occupying a motor vehicle owned by the named insured or a family member who resides with him or her, there is no coverage if Uninsured Motorist coverage was not purchased on this policy for that motor vehicle.
3. If, at the time of the accident the injured person is not occupying a motor vehicle, he or she is entitled to select any limits of Uninsured Motorist coverage for any one vehicle afforded by any one policy under which he or she is insured.

If you select Non-stacked Uninsured Motorist coverage, then Uninsured Motorist coverage will not apply under this policy if an insured person: (1) elects to recover Uninsured Motorist coverage benefits under another policy when injured as a pedestrian or while not occupying a motor vehicle; or (2) elects to recover excess Uninsured Motorist coverage benefits under a policy other than this policy in addition to the Uninsured Motorist coverage on the motor vehicle he or she is occupying when injured while occupying a motor vehicle that is not owned by any person insured under this policy.

FIG. 12

Policy number: <Policy number>
<Named Insured Full Name>
<1 Insured Named and full name>
Page <1> of <2>

Your policy will be issued with Stacked Uninsured Motorist coverage unless you select the Non-stacked Uninsured Motorist coverage option below.

Selection/Rejection of Coverage Instructions

Florida Applicants: If you do not want Stacked Uninsured Motorist coverage equal to your Bodily Injury Liability limits, you must select one of the options below. You may select Uninsured Motorist coverage limits up to the Bodily Injury Liability limits in your policy or you may reject Uninsured Motorist coverage entirely. If you do not reject Uninsured Motorist coverage entirely you may select Stacked Uninsured Motorist or Non-stacked Uninsured Motorist. If you do not send back this form, you will have Stacked Uninsured Motorist coverage equal to your Bodily Injury Liability limits.

Renewal/Existing Florida Policyholders: Your current declarations page reflects your previous selection or rejection of Uninsured Motorist coverage. Your previous selection or rejection will continue to apply to your existing policy and any policy that renews, extends, supersedes, or replaces your existing policy unless you request a change to your previous selection or rejection in writing. Any change to Uninsured Motorist coverage will not become effective until the Company receives the properly completed selection/rejection form.

Your previous selection or rejection also will continue to apply to any policy that changes your existing policy unless you request a change to your previous selection or rejection in writing. Any change to Uninsured Motorist coverage will not become effective until the Company receives the properly completed selection/rejection form.

However, if you are receiving this form because you changed your Bodily Injury Liability limits, then your Uninsured Motorist coverage limits will be changed, effective back to the date that you changed your Bodily Injury Liability limits, to Stacked Uninsured Motorist coverage equal to your revised Bodily Injury Liability limits if you do not follow the above instructions for Florida Applicants by selecting one of the options below. If you do not want Stacked Uninsured Motorist coverage equal to your Bodily Injury Liability limits, you must follow the above instructions for Florida Applicants.

Selection/Rejection of Coverage
Please select one coverage option below and a limits amount if listed under that option:

- ☐ I want Stacked Uninsured Motorist coverage in the same limits as my Bodily Injury Liability coverage. (Note: If you select this option the first paragraph of this form shall not apply.)
- ☐ I want Non-stacked Uninsured Motorist coverage in the same limits as my Bodily Injury Liability coverage.
- ☐ I want Stacked Uninsured Motorist coverage at the limits amount selected below, which selection is lower than the limits of my Bodily Injury Liability coverage.
  - ☐ $10,000 each person/$20,000 each accident
  - ☐ $25,000 each person/$50,000 each accident
  - ☐ $50,000 each person/$100,000 each accident
  - ☐ $100,000 each person/$300,000 each accident
  - ☐ $250,000 each person/$500,000 each accident
  - ☐ $300,000 combined single limit each accident
- ☐ <Additional coverage text>

FIG. 13

Policy Number: <Policy Number>
<Named Insured Full Name>
<Second Named Insured Full Name>
Page <##> of <##>

☐ $300,000 Combined Single Limit

☐ I reject all Uninsured Motorist coverage.

I understand and agree that this selection of the option above applies to my liability insurance policy, and will also apply to any renewals or replacements of such policy that are issued with the same Bodily Injury Liability limits as this policy. If I decide to request a change to my selection, the change will not become effective until the Company receives your selection on this form and it has been completed and signed.

Signature of named insured          Date

X <xxxxx x xxxxxxx xxx>          <Month dd, yyyy>

FIG. 14

INTELLIGENT ROUTING CONTROL

PRIORITY CLAIM

This application is a continuation-in-part of U.S. patent application Ser. No. 16/874,521, filed May 14, 2020, which is a continuation of Ser. No. 16/374,480 filed Apr. 3, 2019, now U.S. Pat. No. 10,657,603, all of which are herein incorporated by reference.

BACKGROUND OF THE DISCLOSURE

1. Technical Field

This disclosure relates to automated agents, and specifically to automated agents that execute document classifications and determine document distributions at the page level and execute updates or modifications in response to the classifications.

2. Related Art

The conversion and distribution of physical documents is challenging. Documents come in many forms and contain diverse content. The documents include proof of prior insurance, insurance cancellation documents, credit authorization forms, discount forms, uninsured motorist forms, insurance application packets, etc., and any combination of information. The endless sizes, page orientations, layouts, and formats make it nearly impossible to process and translate documents into standardized forms. Many systems cannot make logical deductions, make logical inferences, or detect incomplete information. The systems do not learn from experiences or analyze contexts.

BRIEF DESCRIPTION OF THE DRAWINGS

The disclosure is better understood with reference to the following drawings and description. The elements in the figures are not necessarily to scale, emphasis instead being placed upon illustrating the principles of the disclosure. Moreover, in the figures, like referenced numerals designate corresponding parts throughout the different views.

FIGS. 9A and 9B are an exemplary form.

FIGS. 12-14 are a template of an uninsured motorist form.

DETAILED DESCRIPTION

A processing system and method (referred to as a processing agent) translate and expedite content delivery of physical and virtual documents. The processing agent's end-to-end learning system discovers contexts and uses contextual knowledge to efficiently route documents to destinations and perform functions. A detection system accurately detects anomalies, and in some applications, protects backend systems from unsolicited messages asynchronously transmitted to many recipients. An automated job separation system parses documents by breaking and splitting documents into individual pages so that only desired pages are routed to apt destinations. The job separation system enables multiple documents to be automatically processed simultaneously without job separation sheets.

Some processing agents include export application programming interfaces (APIs) that transmit documents in any desired format to a folder, an address, or a destination that may execute further processing. Some systems transmit commands that enable scripts. Scripts may request information from remote sources, generate and transmit forms to users, notify users of outcomes, render one or more indexing systems and/or automation systems and issue audible or visual alerts to sources or users that signal an error, missing information, or a warning. Some document processing agents execute data compressions that reduce memory and bandwidth use and execute multiple encryptions to maintain security. The document processing agents execute classifications across multiple nodes allowing the processing agents to distribute classification and jobs across local and/or remote computing resources.

Figure 1:
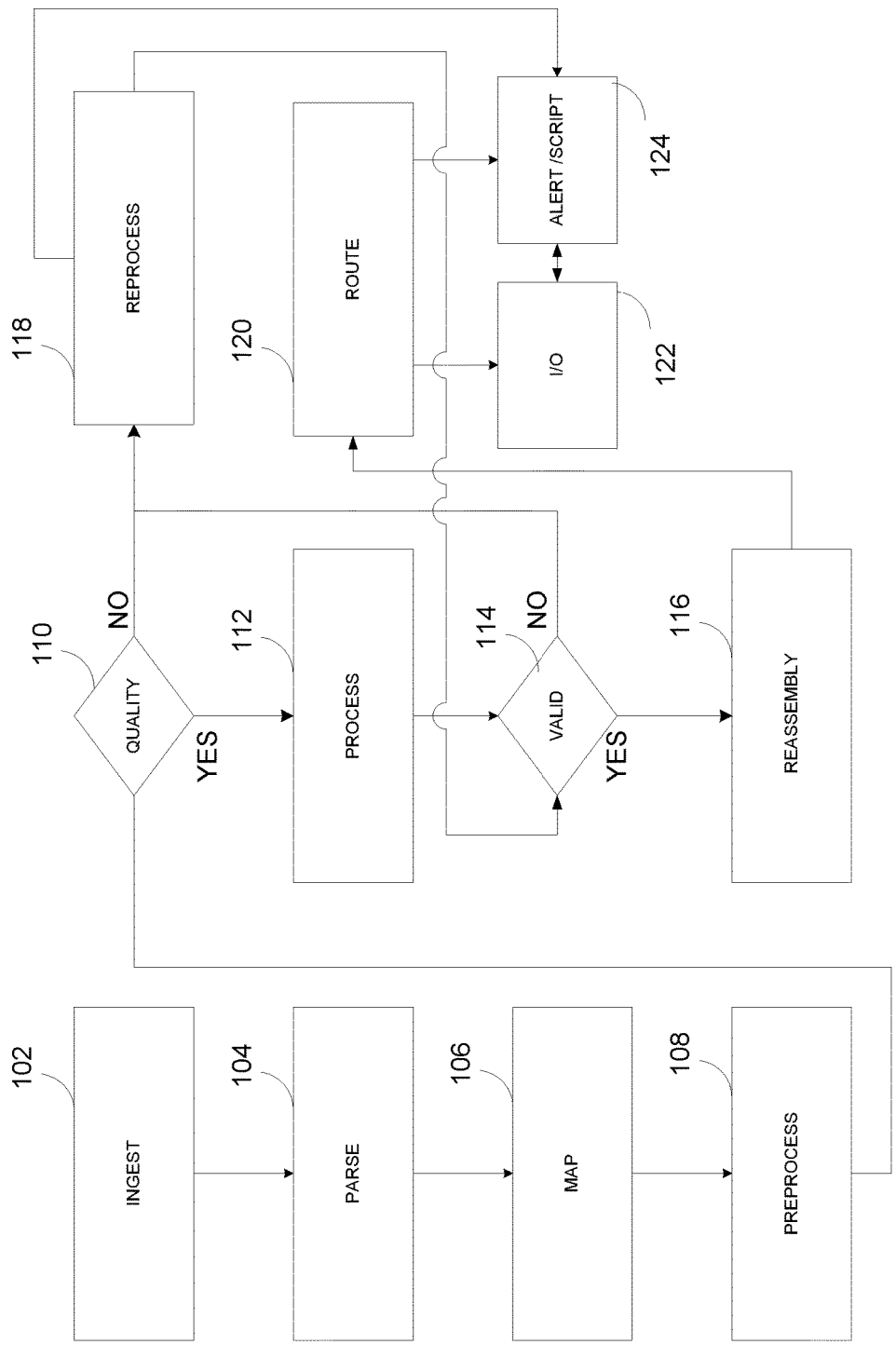
FIG. 1 is a process flow of a processing agent.
Figure 2:
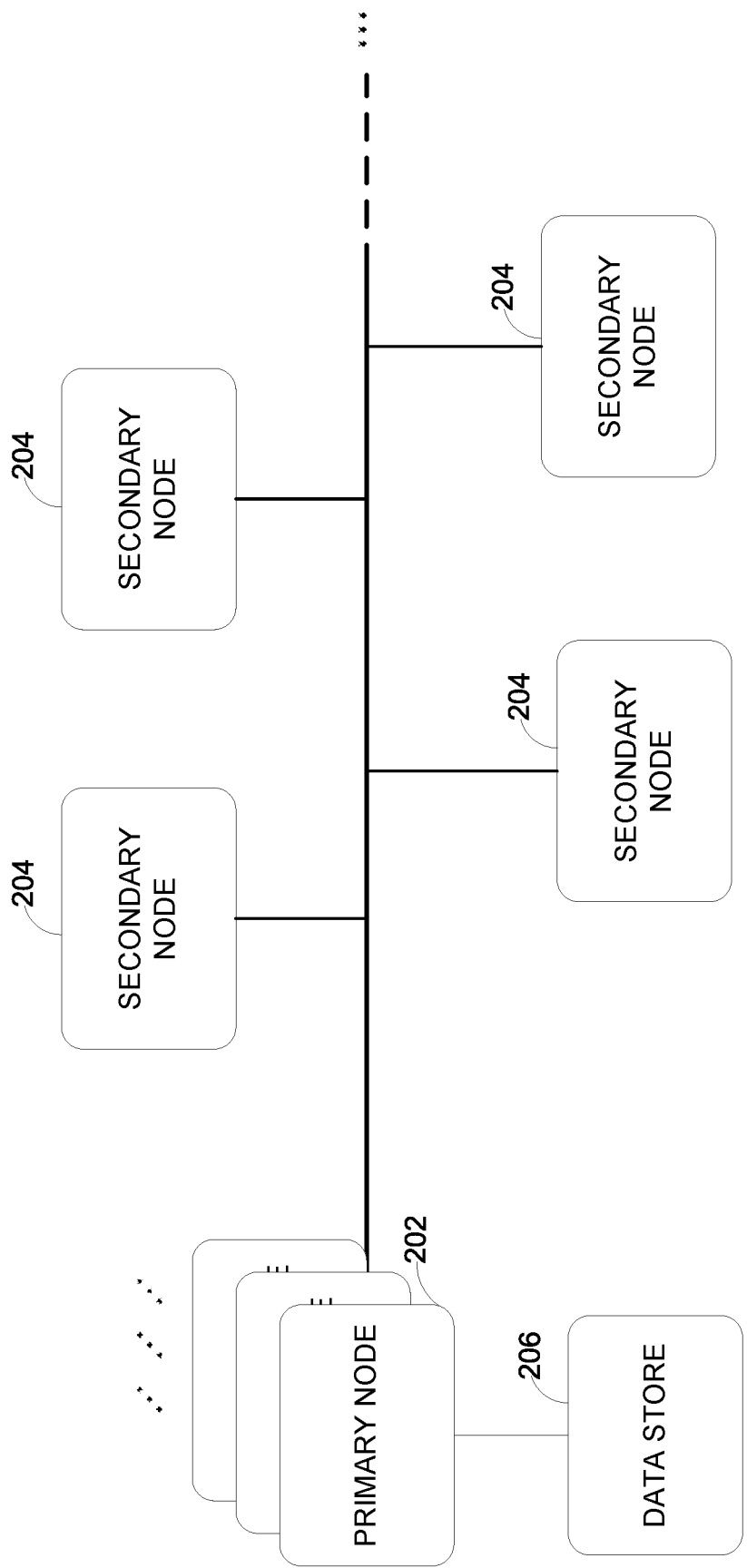
FIG. 2 is block diagram of a processing agent.

FIG. 1 is a block diagram of a document processing agent provides document conversions and routing through primary nodes 202 and secondary nodes 204 shown in FIG. 2. The primary nodes 202 pre-process, parse, track, and reassemble select pages of the documents received and stored in an assessment queue that ingests input 102. The secondary nodes 204 detect and classify content, validate content, and generate and embed routing data into individual pages or metadata that is processed to route the content to correct destinations over the most efficient transmission route available to the processing agent. Routing occurs at the page level independent of the original intended destination of the document. The independent routing occurs through machine learning without relying strictly on deterministic rules. The primary and secondary nodes 202 and 204 are clients, servers, or peers to other primary 202 and secondary nodes 204 and utilize a separate processor or a graphical processor unit that communicates through a communication system such as a bus. The secondary nodes 204 operate asynchronously and independently of each other and the primary nodes 202 and process documents or portions of them simultaneously in parallel (i.e., the processing of input in tandem at the same time). Each secondary node 204 is analogous to a separate processor with access to local memory that detects, classifies, and validates content and generates routing data mapped or directly inserted into metadata and/or the individual pages through a parallel architecture.

In FIG. 1, an assessment queue receives and stores one or more documents from a local or remote source such as a memory or a device (represented as ingest 102). The assessment queue is a multi-element data structure that adheres to a first-in-first-out (FIFO) processing sequence. In alternate processing agents, document removal from the assessment queue is based on factors other than the order of insertion; for example, when a priority value is assigned to one or more documents, the priority value may change the output sequence of the assessment queue. In yet another alternate system, a dequeue is used in which documents are added or removed from either an insertion input/output (I/O) port or a removal I/O port of the dequeue. That is, the dequeue can operate in a last-in-first-out (LIFO) sequence, a FIFO sequence, or a combination of LIFO and FIFO sequences during a conversion and/or routing session. A session refers to a series of requests and responses to complete the task or a set of tasks such as the processing, reassembly, and/or routing of pages or documents between clients and servers. A client is a device that accesses resources from another device via a network connection and a server is the device that responds to the client and controls access to the network and the server's resources.

In FIG. 1, one or more primary nodes 202 process the documents stored in the assessment queue. The primary nodes 202 filter the documents to detect content resolution and page orientation. A parser 104 converts the documents from one file format to another file format that removes the original metadata appended to the documents. The conversion also splits, rips or extracts pages from documents rendering smaller documents or files, with each of ripped page representing no more than the size of a physical page. A physical page is one side of a single sheet of paper. It maybe in standard sizes that are frequently referenced as letter size, legal size, executive size, A4 size, A5 size, A6 size, B5 size, B6 size, postscript size, or an envelope size. In some applications, the total number of pages in a document determines the minimum number of documents or files rendered by the parser 104. Pages are ripped at an identifying page, section delimiters, headers, page breaks, section breaks, identifiers, etc.

To ensure ripped pages are distributed across computing resources, the primary node 202 distributes the computational and storage workload across the secondary nodes 204 at 106 and tracks page distribution in a data store 206. Distribution optimizes resource use, maximizes throughput, minimizes response times, and avoids overload conditions at the secondary nodes 204. In some document processing agents, multiple primary nodes 202 distribute the ripped pages, which increases the reliability of the processing agent through redundancy. To improve character recognition, each secondary node 204 sharpens text, straightens images (e.g., deskew), applies one or more descreen filters that remove artifacts, and/or removes the backgrounds. These processes improve textual and character matching at 108.

The secondary nodes 204 analyze text and characters by analyzing optical contrasts (e.g., a detection of dark and light). Once detected, the secondary nodes 204 execute a pattern matching with a stored set of shapes and characters to translate the analyzed elements into an ASCII character set. Each data element of the character set includes a confidence score that represents a probability that the results returned match the content contained in the document. Because different typefaces and text treatments, such as bold and italic formats, for example, can significantly affect the way text and characters are detected, some processing agents execute sophisticated pattern-matching to learn new characters, typefaces, and adapt to different character sizes. Alternate systems achieve high accuracy by executing intelligent word recognition; and other alternates limit input to predefined text and character formats. In FIG. 1, when a confidence score is below a predetermined threshold, the secondary node 204 sets a flag, which terminates the recognition and causes the primary node 202 or secondary node 204 to transmit the subject page(s) to a remote or manual recognition at 110 and 118 or execute a recursive analysis of the processing described above (e.g., "n" number of repetitions of the classification analysis described). The flag is a marker of some type used by the primary node 202 to indicate the existence or status of a particular classification condition.

In FIG. 1, an encoding function converts the recognized text and characters into a recognition vector. The scalar variable of the vector may be assigned by a scalar function and adjusted by a weighting function that gives some words and phrases and characters of the document more "weight" or influence than other words and phrases. Weights may be assigned based on word and phrase counts in a page, their presence in an active grammar, or based on their association with pre-identified document types. An active grammar is a file that contains a list of words and phrases recognized by the machine learning algorithm.

In FIG. 1, the machine learning algorithm designates pages into classes or categories of documents through rules and/or decision trees that process the recognition vector at the secondary nodes 204 at 112. The decision trees process the recognition vector based on features that either classify the pages or predict the document types that the recognition vector belongs to. A document type refers to characteristics or identifiers that represent the characteristics that may be embedded in metadata or the document itself that identifies or defines the document. It may include elements and attributes. For example, an insurance quote, an insurance application, and an insurance claim are different insurance document types.

In FIG. 1, each branch in the decision tree divides data elements into several groups. Each leaf node is allocated with a single label, such as a class or a predicted value. The data is allocated to the appropriate leaf node, and the prediction is the label of that leaf node. To avoid overfitting, multiple decision trees are added together. For instance, when an exemplary document processing agent attempts to identify an insurance claim, the predicted identity at any point is the sum of the predictions of the individual decision trees trained on claim data.

Before use, each decision tree is trained iteratively one decision tree at a time. For example, when a decision tree attempts to identify an insurance claim page, the system first trains a decision tree on words and phrases that are unique to insurance claims. The decision tree is trained to minimize a loss function—such as a mean squared error (when mean is used) or mean absolute error (when a median is used), for example,—by recursively splitting the training data in a way that maximizes a recognition of insurance claim criterion until a limit is met. The criterion is chosen so that the loss function is minimized by each split. In some alternate machine learning algorithms, the process is based on an extreme gradient boost.

A second decision tree is then trained to minimize the loss function of the first decision tree when its outputs are added to the first decision tree. This is achieved by recursively splitting the training data according to a second criterion. The criterion may be calculated based on gradient statistics. A third decision tree is then sequentially trained to minimize the loss function of the second decision tree when its outputs are added to the first and the second decision trees. This is achieved by recursively splitting the training data according to a third criterion. Thereafter, "n" number of subsequent trees are sequentially generated and added to the algorithm such that each subsequent tree aims to reduce the errors rendered by the previous tree. Each tree learns from its immediate predecessors and updates the learning algorithm's residual errors. Hence, the tree that grows next in the sequence will learn from an updated version of the residuals and in effect render a stronger learned model by effectively combining the predictive power of all of the prior decision trees.

The time needed to train a tree-based algorithm is proportional to the number of splits that are evaluated. Since small changes in the split may not significantly affect performance, some methods group features into bins and split the bins instead of the features based on gradient statistics. This evolutionary process is like subsampling the number of splits that the prediction or classification algorithm evaluates. Since the features can be binned before building each tree, the evolutionary process speeds up training and reduces computational complexity.

When the characteristics of the recognized vector are classified by the machine learning algorithm at 112 and optional deterministic rules that execute comparisons between recognized and predetermined words and/or phrases, the document type classification is generated and embedded or mapped into the page and/or metadata thereafter associated with the page. Some processing agents then validate the classifications at the primary or secondary node 202 or 204 at the page level at 114. For example, if a page is designated a proof of insurance document, a primary or secondary node 202 or 204 may execute a comparison against valid insurance policy content, valid insurance policy numbers, valid insurance policy formats, valid insurance policy digital or cursive signatures (e.g., a comparison to known patterns), or other criteria. If unconfirmed, the pages are routed to a reprocessing 118 which may occur via remote or manual recognition at 118 or via a recursive analysis of the processing described above (e.g., "n" number of repetitions of the classification analysis described). If confirmed, the primary node 202 assembles new documents from the classified pages.

Assembly occurs through merger rules and sub-rules at 116. The sub-rules allow users or devices to issue commands that merge pages through two or more criteria. For example, an exemplary merger rule may merge pages based on a single criterion. A rule may cause the primary node 202 to merge pages that share a common classification. However, when one or more rules and one or more sub-rules are executed with a Boolean operator (e.g., AND, OR, NOT, etc.) or function a more advanced merging occurs. For example, a rule and sub-rule combination may cause a primary node 202 to combine pages that originate from an originating document (e.g., an unparsed document) or source and share a common classification with a dynamically generated or originally received cover sheet. The cover sheet page may serve as a source identifier. It is the page level classifications rather than an originating document designation and merger strategies that determine which pages are routed to separate and unique destinations and where the pages are routed. In some instances, pages are routed to multiple destinations automatically (without user directions) simplifying a user's online experience and reducing the bandwidth required to support multiple request/response exchanges.

In FIG. 1, merger strategies may be stored in individual profiles in memory. The profiles allow users to customize merger strategies that may be based on any property or metadata associated with the classified pages, identified document types, and/or originating document and/or any other criteria or criterion. The profiles may determine how page merges occur (e.g., what criteria determines page selection), where the merges occur (e.g., at the primary or secondary nodes 202 and 204), the computer file formats they occur in (e.g., what format is used, a portable document format, a WORD format, an image format, etc.), when they occur (e.g., timing), how the merged pages are compressed, and/or how the merged pages are distributed (e.g., the medium, email, file transfers, etc.).

With the processed documents assembled from the page level independent of the composite or arrangement of the original document, the processing agents route the newly assembled document at 120 to one or more destinations or trigger an alert or enable script at 122 and 124. The trigger may occur in response to the classification. In FIG. 1, the metadata generated by machine learning algorithm determines where the processed document is routed and whether it triggers another script, such as a script that initiates an automation process or initiates an alert. A script or an alert may be triggered when the document is fully processed or classified, or the document is missing information or when it is filled out incorrectly. As a result, a script may generate and trigger an automation system that processes the classified documents rendered by the processing agent, or generate a new form, or provide additional instructions, or transmit a message directly to a user or device (e.g., via an email or via the transmission of a Uniform Resource Locator or URL) that are automatically transmitted to the user or device in response to the automated routing or manual or remote review. A script is a computer program consisting of a set of instructions executed by an application or a utility program.

Figure 3:
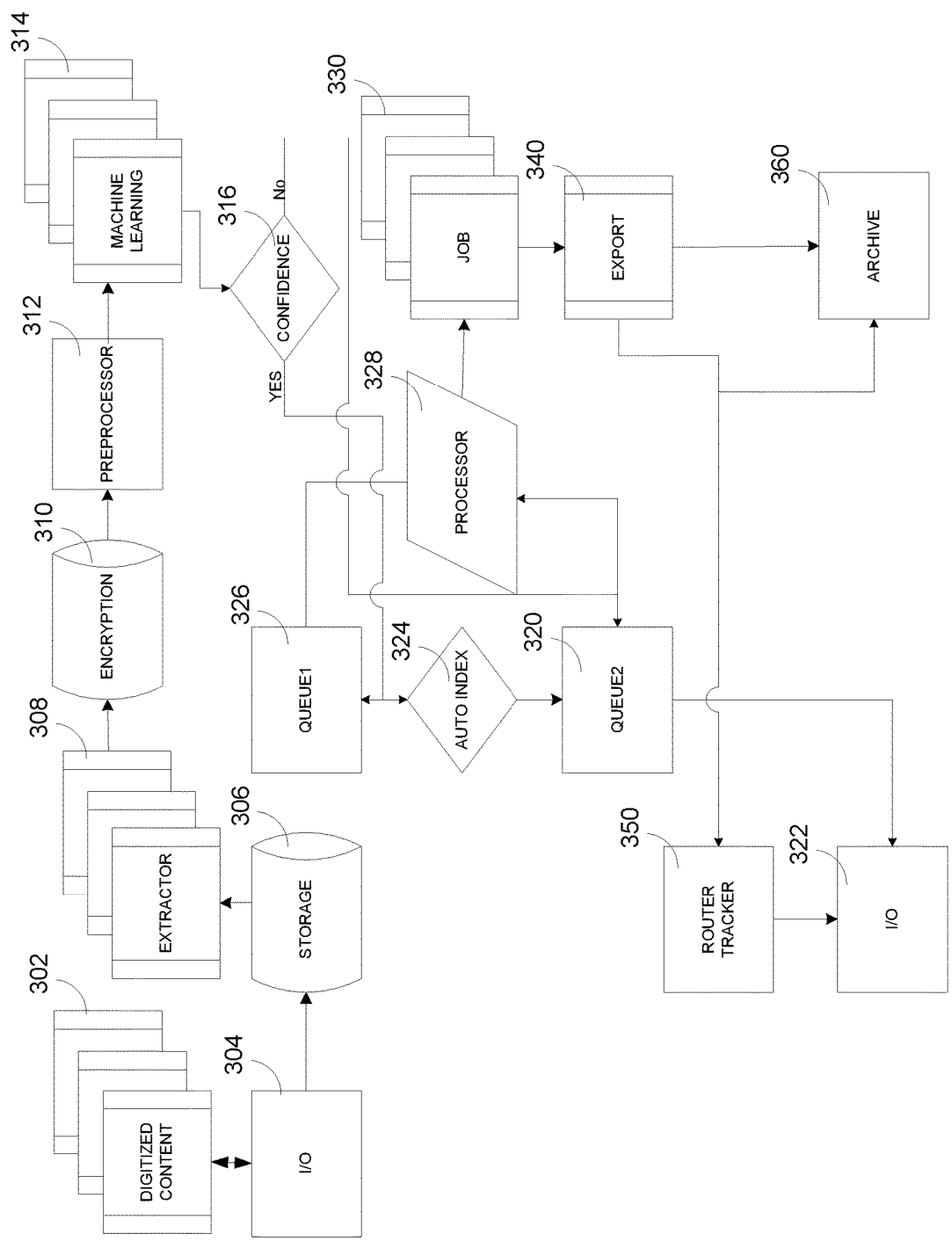
FIG. 3 is a process flow of a second processing agent.

FIG. 3 illustrates a second processing agent in which the digitized content 302 is received and ingested in the assessment queue in memory 306 through an I/O request from a remote and/or local source and/or device. I/O requests are commands, such as read and write commands, used to transfer data among various components or portions of components of the processing agents. An API 304 interfaces the digitized content between the processing agent platform and the remote and/or local sources and/or devices.

In FIG. 3, one or more primary nodes 202 process the digitized content stored in the assessment queue. The primary nodes 202 filter the content to detect image resolution and page orientation. An extractor 308 removes metadata originally appended or embedded to or within the digitized content. The removal may occur via many processes, including a conversion of the digitized content from one computer file format to another computer file format that removes metadata or converts it to the same computer file format that removes metadata. The selected conversion removes metadata originally appended, embedded to, or mapped to the digitized content. The extractor 308 also extracts, splits or divides/partitions the content from the digitized content file rendering smaller documents or files, with each page representing no more than a single digital page of the digitized content. A digital page is a fixed block of memory, consisting of a predefined plurality of bytes, programmed to be read from memory that represents a single physical sheet of paper. It is analogous to one side of a single sheet of physical paper or a portion of a Web page that can be seen on a standard computer display without scrolling. In some applications, the total number of extracted pages from the digitized content or a predetermined length or file size determines the minimum number of documents or files rendered by the extractor 308. Pages are extracted at visible or hidden identifiers, section delimiters, headers, page breaks, section breaks, etc.

A computationally secure encryption process secures the extracted pages in a database at 310 through cascading, triple, or quintuple encryption. The encryption uses cryptosystems that are computationally infeasible to break. An algorithm is computationally secure (sometimes called strong) if it cannot be broken with available resources, either current or in the future. A self-enforcing hybrid cryptosystem that uses controlled session keys and user-controlled key policies and/or a volume encryption is an exemplary encryption process used in some processing agents.

To ensure extracted pages are distributed across computing resources, the primary node 202 distributes the computational and storage workload across the secondary nodes 204 at 312 and tracks page distribution in the data store 206. In some processing agents, multiple primary nodes 202 distribute the ripped pages. Each secondary node 204 sharpens text, straightens images, applies one or more descreen filters that remove artifacts, and/or removes the backgrounds that improve textual and character matching contrast at 312.

The secondary nodes 204 analyze text and characters through an optical recognition. Once detected, the secondary nodes 204 execute a pattern matching with a stored set of shapes and characters to translate the analyzed elements into an ASCII character set. Each data element of the character set includes a confidence score that represents a probability that the results returned match the content contained in the document. Alternate systems achieve high accuracy by executing intelligent word recognition. In FIG. 3, when a confidence score is below a predetermined threshold, the secondary node 204 terminates the recognition and causes the primary node 202 or secondary node 204 to transmit the subject page(s) to a remote or manual recognition or a recursive analysis of the processing described above (e.g., "n" number of repetitions of the classification analysis described).

In FIG. 3, an encoding function converts the recognized text and characters into a recognition vector at 312. The scalar variable of the vector is assigned by a scalar function and adjusted by a weighting function. Weights are assigned based on word and phrase counts on a page, their presence in an active grammar, or based on their association with pre-identified document types.

In FIG. 3, one or more machine learning algorithms classifies pages into categories of documents through rules, decision trees, and/or other models that process the recognition vector at the secondary nodes 204. The machine learning algorithms process the recognition vector based on features to either classify the pages or predict or classify the extracted pages into the document type or types to which the recognition vector belongs. A document type refers to characteristics or identifiers that represent the characteristics that are embedded in metadata, or a document that identifies or defines the documents.

In FIG. 3, one or more machine learning algorithms may be derived from an initial model that is designed to predict a page and/or document classification. The model $M_0$ is associated with a residual that may be represented as $b-M_0$. A second model $M_1$ is generated to fit or minimize the residuals of the prior module $M_0$. The first and the second models are combined $M_0+M_1$ rendering a boosted version of the initial model $M_0$ and result in a lower mean squared error than the initial model $M_0$. The equation may be expressed as: $M_1(x) < M_0(x) + M_1(x)$. A third model $M_2$ may then be created that models the second network's residuals to improve the performance of the second model. This is repeated sequentially for "n" iterations until the residuals are minimized to a desired prediction level or mean squared error. A generalized expression of the mean squared error may be expressed as: $M_n(x) < M_{n-1}(x) + M_n(x)$. As such, the additive learning algorithms, which may be encompassed in decision tress, neural networks, etc., do not disturb the functions expressed in the previous and separate models. In some summation of models a serial or sequential and/or parallel processing of the output of one model $M_{n-1}(x)$ imparts additional predications to the input of the next model $M_n(x)$ to reduce errors. Other multiple schemes that may be run or trained in parallel are used in alternate systems.

When the characteristics of the recognized vector are classified by the machine learning algorithm at 112 or deterministic rules that match recognized words and phrases to predetermined words and phrases and/or contexts that uniquely identify document types, the document type classification is embedded into or mapped to the classified page or associated to it through metadata. Some processing agents then validate the classifications at the primary or secondary node 202 or 204 at the page level. Each validation includes a confidence score that represents a probability that the classification matches the predicted document type. For example, if a page is classified as a proof of insurance document, a primary or secondary node 202 or 204 may execute a comparison against pre-validated insurance policy content, valid insurance policy numbers, validated insurance policy formats, validated digital or cursive signatures (e.g., a comparison to known patterns), or other criteria via a field search. If unconfirmed, the pages are routed to a reassessment queue 320 that holds the pages until they are reprocessed by the processes described herein or held until an I/O request is received at API 322. A request may initiate a different recognition process or a manual process. If or when confirmed, the classified pages are automatically indexed at 324 and staged in the reassembly queue 326 to be used to generate new documents. In FIG. 3, the reassessment queue 320 and/or the reassembly queue 326 operate as a dequeue in some systems and/or adhere to a LIFO, FIFO sequence, or follow a combination of LIFO and FIFO processes in other systems. The API 320 interfaces the processing agent platform to remote and/or local sources and/or devices.

Document assembly occurs through merger rules and sub-rules through processor 326. One or more sub-rules allow users or devices to issue commands that merge pages through different and multiple criteria. For example, an exemplary merger rule may merge pages based on a single criterion. A rule may cause the primary node 202 to merge pages that share a common classification. However, when multiple rules and one or more sub-rules are executed with a Boolean operator a more advanced merging occurs. For example, a rule and sub-rule combination may cause a primary node 202 to combine pages that originate from a common or an originating document (e.g., an unparsed document) or source and share a common classification with a dynamically generated or originally received cover sheet. The cover sheet may be a source identifier.

In FIG. 3, merger strategies may be stored in individual profiles in memory. The profiles allow users to customize merger strategies that may be based on any property or metadata associated with the classified pages, identified document types, and/or originating document and/or another criteria or criterion. The profiles may determine when merging occur, where they occur, how they occur, the computer file formats they occur in, and how the merged pages are compressed, how the merged pages are distributed (e.g., the medium), and/or where the merged pages are sent. The compression reduces the memory and bandwidth consumed in storing and transmitting documents. Here, instead of routing entire documents to destinations, processing agents independently and automatically partition the document or digitized content, and route only the select classified pages (e.g. to one or multiple destinations) based on the machine learning page level classifications. In instances where page level classifications have conflicting routing destinations, the export API 340 routes the select classified pages to the highest ranked destinations. This is analogous to a class vote.

With the processed documents assembled at the page level independent of the original document, the merged documents are assigned to a job index 330. The job index improves the page retrieval operation by maintaining a data structure that can locate every classified page without executing a page search. The job index 330 provides a basis for both rapid random lookups and efficient access to classified pages and their metadata. The assembled pages are then routed by an export API 340 that transmits the documents to a destination based on the classifications. Routing information is retained in a log file as a log entry. A log entry is a set of data entries read from and written to by the router tracker 350 that identify the routing information. In FIG. 3, the metadata generated by machine learning algorithm determines where the processed document is going and whether to trigger a script or initiate an alert. One type of script or alert may run when a merged document is missing information or a form was filled out incorrectly. As a result, the script may generate a new document or form, provide additional instructions to respond to the alert, or transmit a message directly to a user. The message maybe delivered through email or a uniform resource locator.

Figure 4:
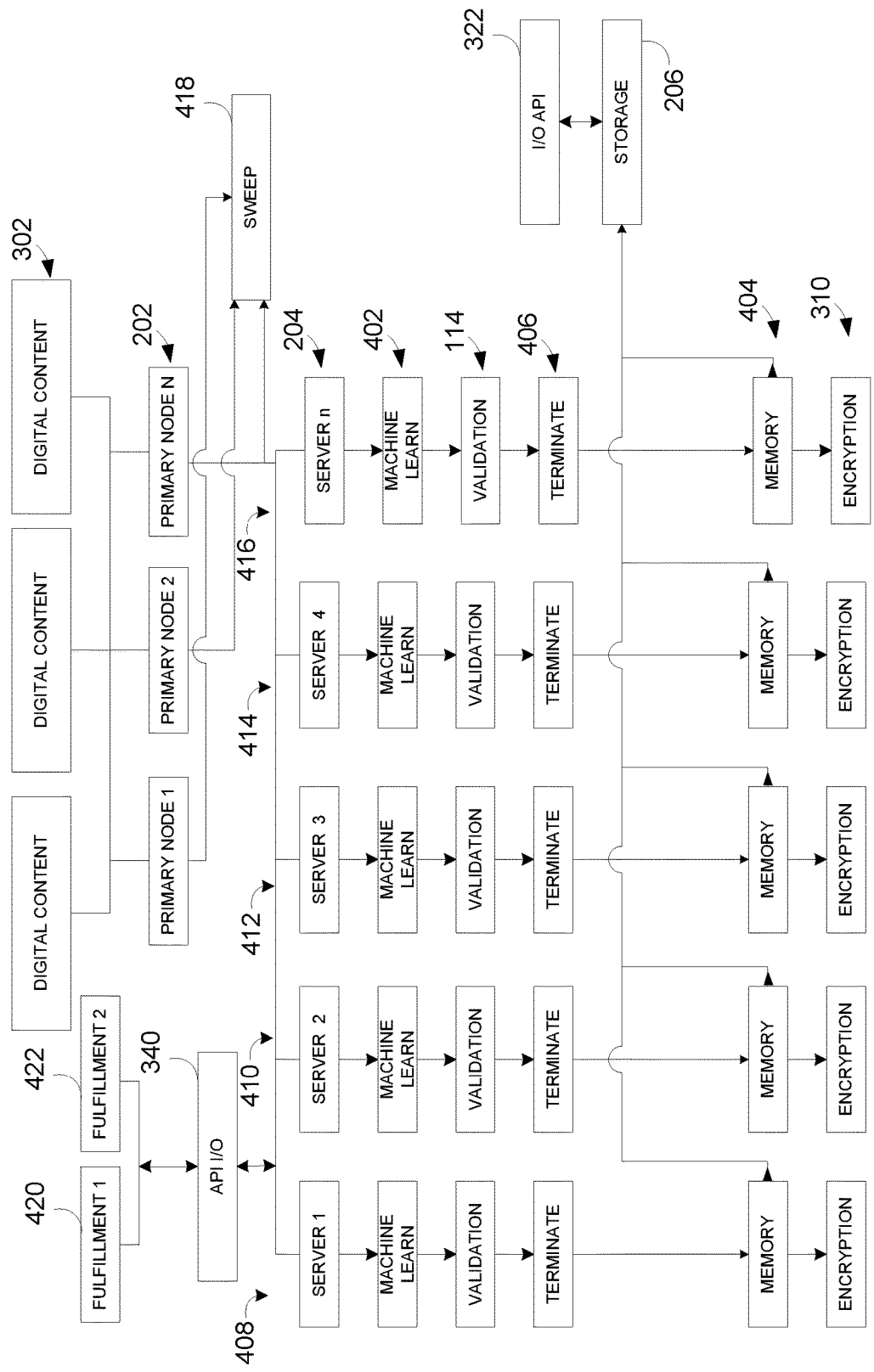
FIG. 4 is a block diagram of a processing agent integrated within an enterprise.

FIG. 4 is an alternate block diagram that integrates a processing agent into an enterprise system. In FIG. 4, digitized content 302 is received and ingested in the assessment queue in memory through an I/O request from a remote and/or local source and/or device. An integrated API within the primary nodes 202 interfaces the digitized content between the processing agent platform and the remote and/or local sources and/or devices.

In FIG. 4, a plurality of primary nodes 202 process the digitized content stored in the assessment queue. The primary nodes 202 filter the content to detect image resolution and page orientation. It converts the content from one file format to another or same format and removes metadata originally appended, mapped, or embedded to or within the digitized content. The primary nodes 202 also extract pages or divides the content from the digitized content queue rendering smaller documents or files, with each page representing no more than a single digital page of the digitized content. In some applications, the total number of extracted pages from the digitized content or a predetermined length or file size determines the minimum number of documents or files rendered by the primary node 202. Pages are extracted at visible or hidden identifiers, section delimiters, headers, page breaks, section breaks, etc.

To ensure extracted pages are distributed across computing resources, the primary nodes 202 distribute the computational and storage workload across the secondary nodes 204 (shown as servers 1 to N) and track page distribution in the data store 206. Each secondary node 204 sharpens text, straightens images, applies one or more descreen filters that remove artifacts, and/or removes the backgrounds that improve textual and character matching contrast at 312.

The secondary nodes 204 analyze text and characters through a character recognition. Once detected, the secondary nodes 204 execute a pattern matching with a stored set of shapes and characters to the translate the analyzed elements into an ASCII character set. Each data element of the character set includes a confidence score that represents a probability that the results returned match the content contained in the document. Alternate systems achieve high accuracy by executing intelligent word recognition. In FIG. 4, when a confidence score is below a predetermined threshold, the secondary node 204 terminates the recognition and causes one of the primary nodes 202 or secondary nodes 204 to transmit the subject page(s) to a remote or manual recognition or initiates a recursive analysis of the processing described above (e.g., "n" number of repetitions of the classification analysis described).

In FIG. 4, an encoding function executed on the secondary nodes 204 converts the recognized text and characters into a recognition vector. The scalar variables of the vector are assigned by a scalar function and adjusted by a weighting function. Weights are assigned based on word and phrase counts on a page, their presence in an active grammar, or based on their association with pre-identified document types.

In FIG. 4, one or more machine learning algorithms 602 classify pages into categories of documents through rules, decision trees, and/or other models that process the recognition vector at the secondary nodes 204. The machine learning algorithms described herein process the recognition vector based on features to either classify the pages or predict extracted pages into the document type or types the recognition vector belong to.

When the characteristics of the recognized vector are classified by the machine learning algorithms 402 or deterministic rules that match recognized words and phrases to predetermined words and phrases or contexts that uniquely identify document types, the document type classification is embedded into the classified page or associated to it through metadata encrypted in memory 310 and 404. Some processing agents then validate the classifications at the primary or secondary nodes 202 at the page level. Each validation includes a confidence score that represents a probability that the classification matches the predicted document type. If unconfirmed, the pages are routed to a reassessment queue (not shown) that holds the pages until they are reprocessed by the processes described herein or held until an I/O request is received at the primary nodes 202. A request may initiate a different automated recognition process or a manual recognition process. If or when confirmed, the classified pages are automatically indexed at the secondary nodes and staged in a reassembly queue to be processed into new documents. In FIG. 4, the reassembly queue is integrated within the primary nodes 202.

In FIG. 4, a control engine within the primary nodes 202 enforces a time-out function for each page spread across the secondary nodes. If a classification or prediction process exceeds a predetermined time period (e.g., often in minutes or seconds), the primary nodes 202 terminate processing at 406, stores the fulfillment items in the data store 206, and clears memory 404. A fulfillment refers to the complete classification process from receipt of the digitized content in the assessment queue to the mapping or embedding of the classification or prediction in the metadata or extracted pages at the secondary nodes 204 and in some applications, may refer to post processing of the merged document. Fulfillment also includes the information retained in a log file as a log entry that track all of the processing of the cluster. A cluster refers to the group of independent network servers and associated controllers that operate and appear to clients (here, the primary nodes 202) as if they were a single unit. In FIG. 4, the five clusters 408-416 shown are designed to improve network capacity by, among other things, enabling the servers to process partitioned loads, which enhances network stability and minimizes data loss when systems fail.

In FIG. 4, the control engines of the primary nodes 202 continuously monitor the secondary nodes 204, looking for page classifications as they are generated. The control engines also track each of the classification processes, so that if a cluster executes a predetermined amount of processing time or resources, such as it processed about 75% of the pages it received for example in a predetermined amount of time, the sweep engine pushes the remaining 25% of the pages into a reassessment queue that processes the reaming pages as if they were originally received in the assessment queue. In FIG. 4, the sweep engine 418 runs at predetermined intervals, such as every ten minutes, for example, and also terminates at a fixed time period. Here, the control engine terminates the continuing assessments after about two hours.

Document assembly occurs through merger rules and sub-rules. One or more sub-rules allow users or devices to issue commands that merge pages through different and multiple criteria that is accessible to the fulfillment engines 420 and 422 through the export I/O API 340. In FIG. 4, merger strategies may be stored as individual profiles in the data store 206. The profiles allow users to customize merger strategies that may be based on any property or metadata associated with the classified pages, identified document types, and/or originating document and/or other criteria or criterion. The profiles may determine when mergers occur, where they occur, how they occur, the computer file formats they occur in and how the merged pages are compressed, how the merged pages are distributed (e.g., the medium) and/or what destination they are sent to.

Figure 11A:
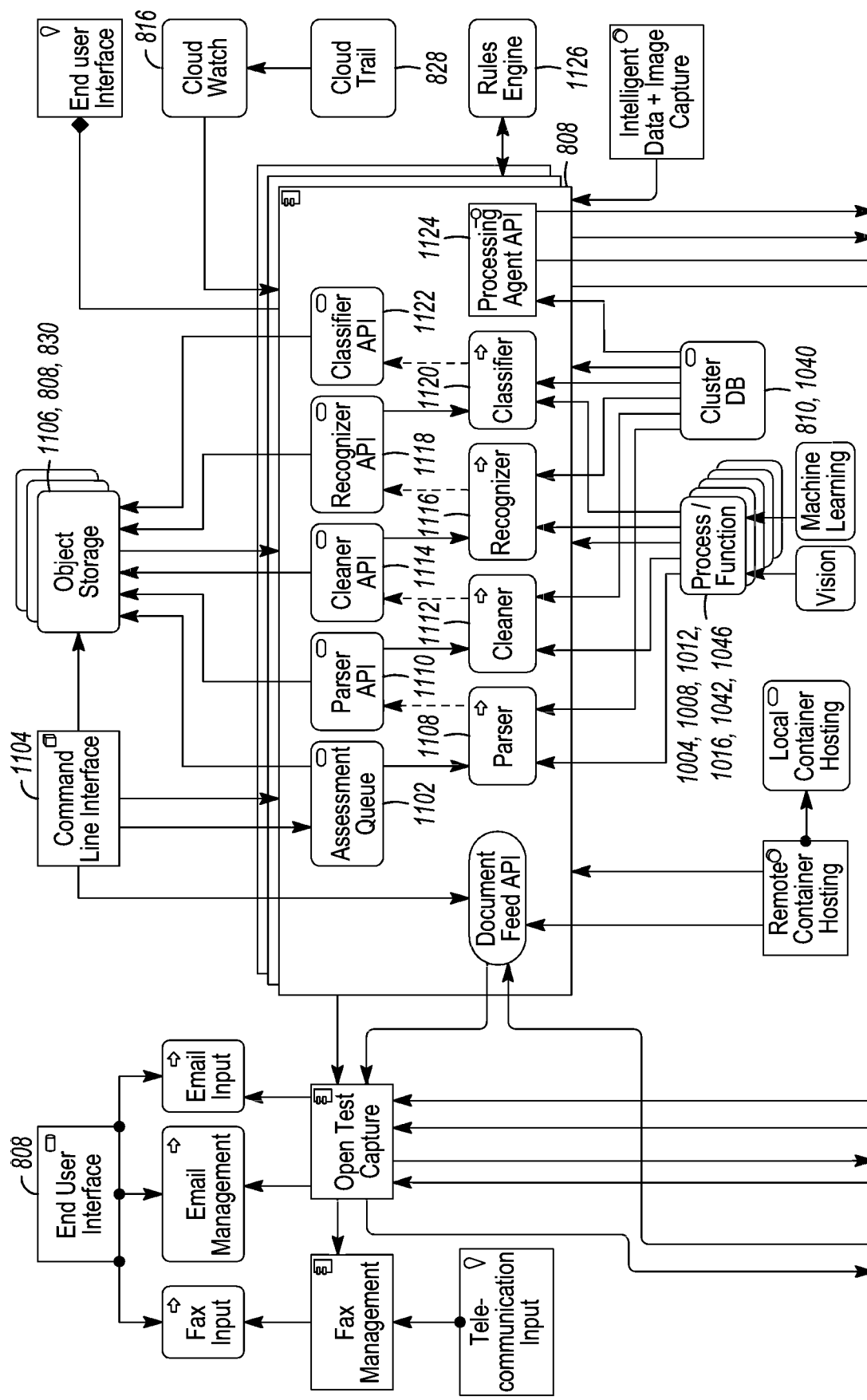
FIGS. 11A and 11B are a block diagram of a second indexing agent interfacing an automation system.
Figure 11B:
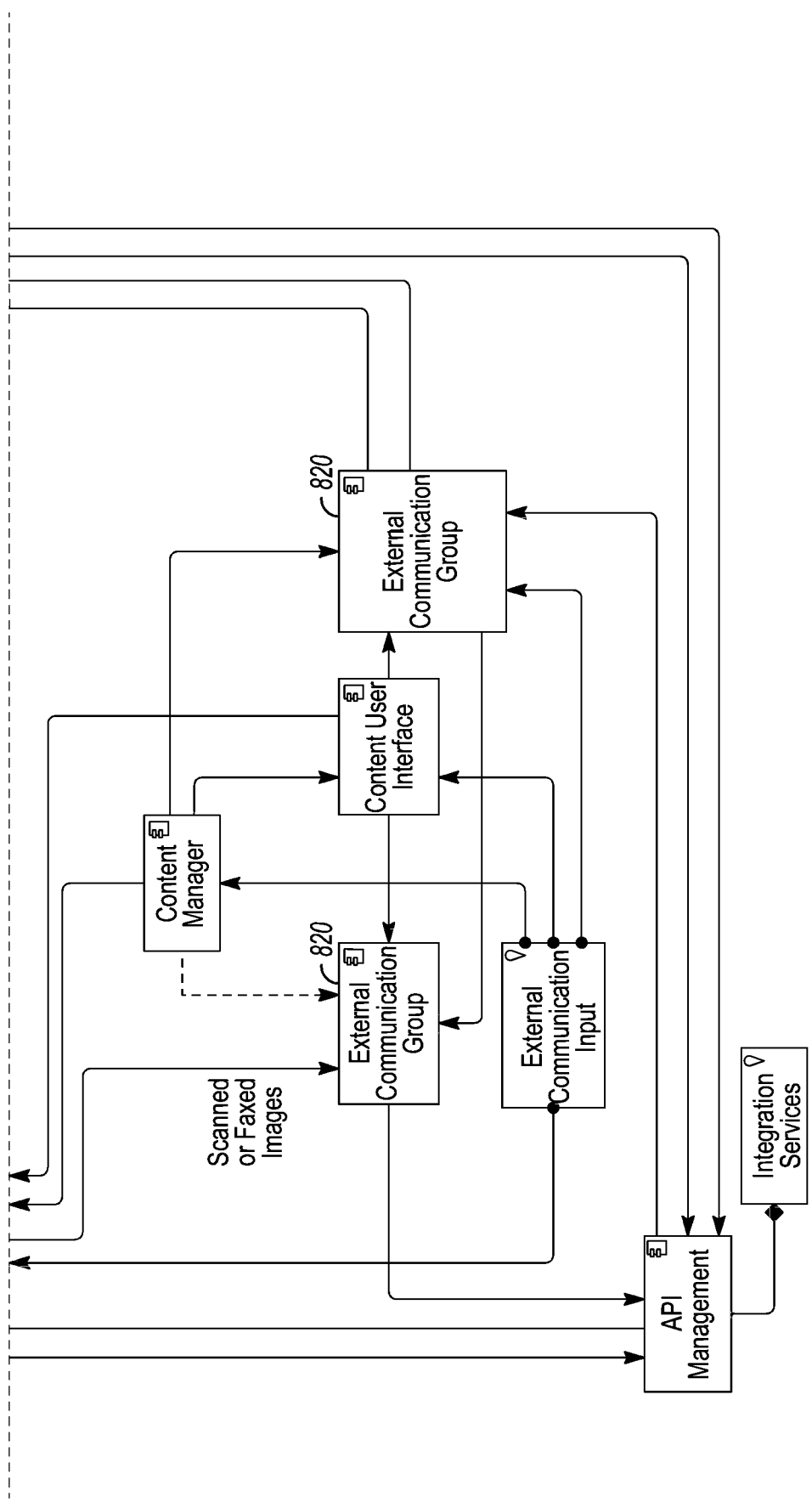

With the processed documents assembled, the assembled pages are routed by an export API 340 that transmits the documents to a destination based on the classification, and in some systems, a rules engine 1126 shown in FIGS. 11A and 11B. Routing information is retained in a log file as a log entry. In FIG. 4, the metadata generated by machine learning algorithm determines where the processed document is going and whether to trigger a script or initiate an alert.

Figure 5:
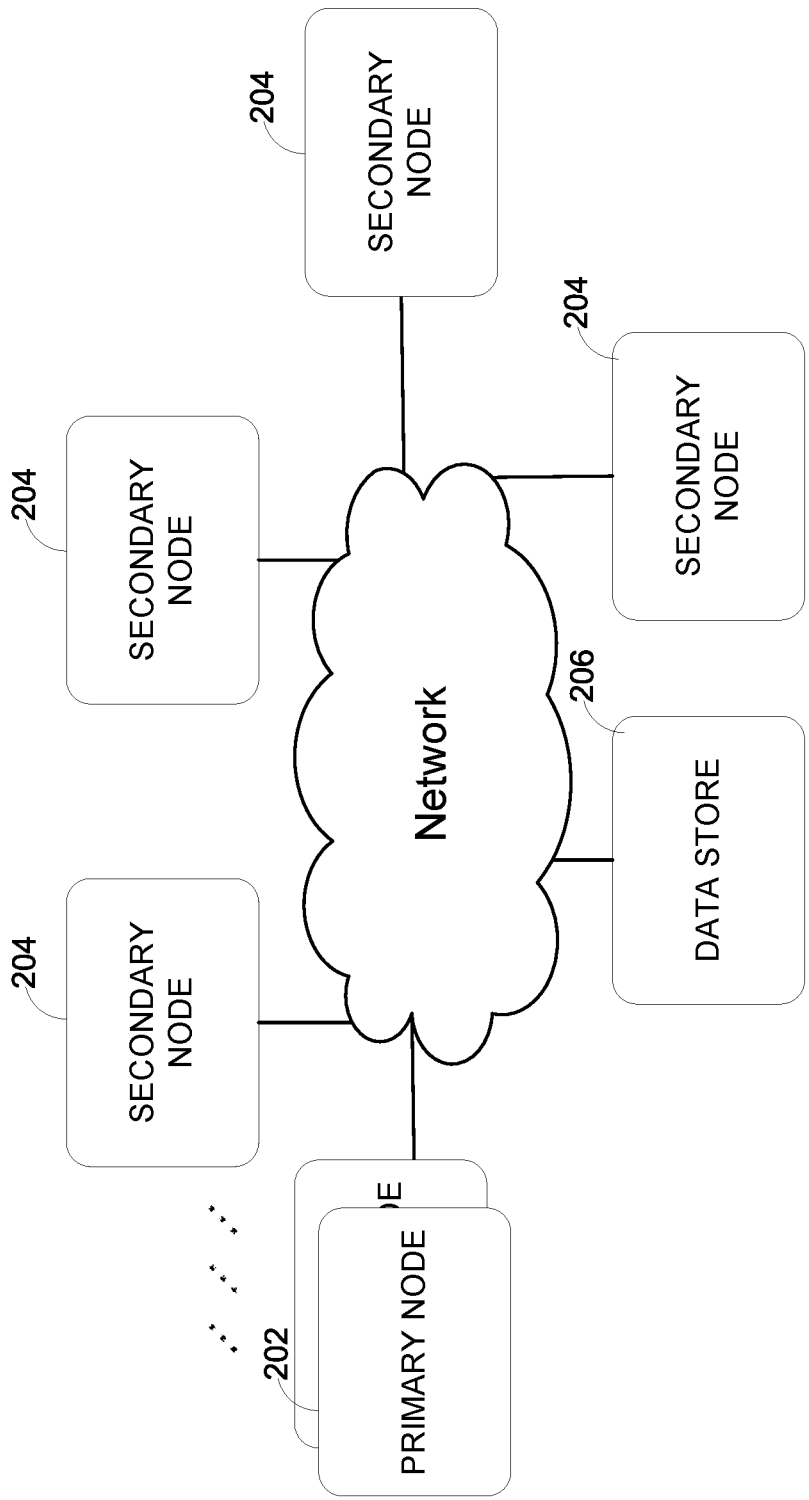
FIG. 5 is an alternate processing agent.

FIG. 5 is an alternate block diagram of the processing agent of FIG. 2. In FIG. 5, the communication bus of FIG. 2 is replaced by a network that allows the primary nodes 202, the secondary nodes 204, and the data store 206, to be hosted on remote distributed systems or time sharing network. The primary nodes 202, the secondary nodes 204, and the data store 206 and their alternates function as described above and herein.

Figure 6:
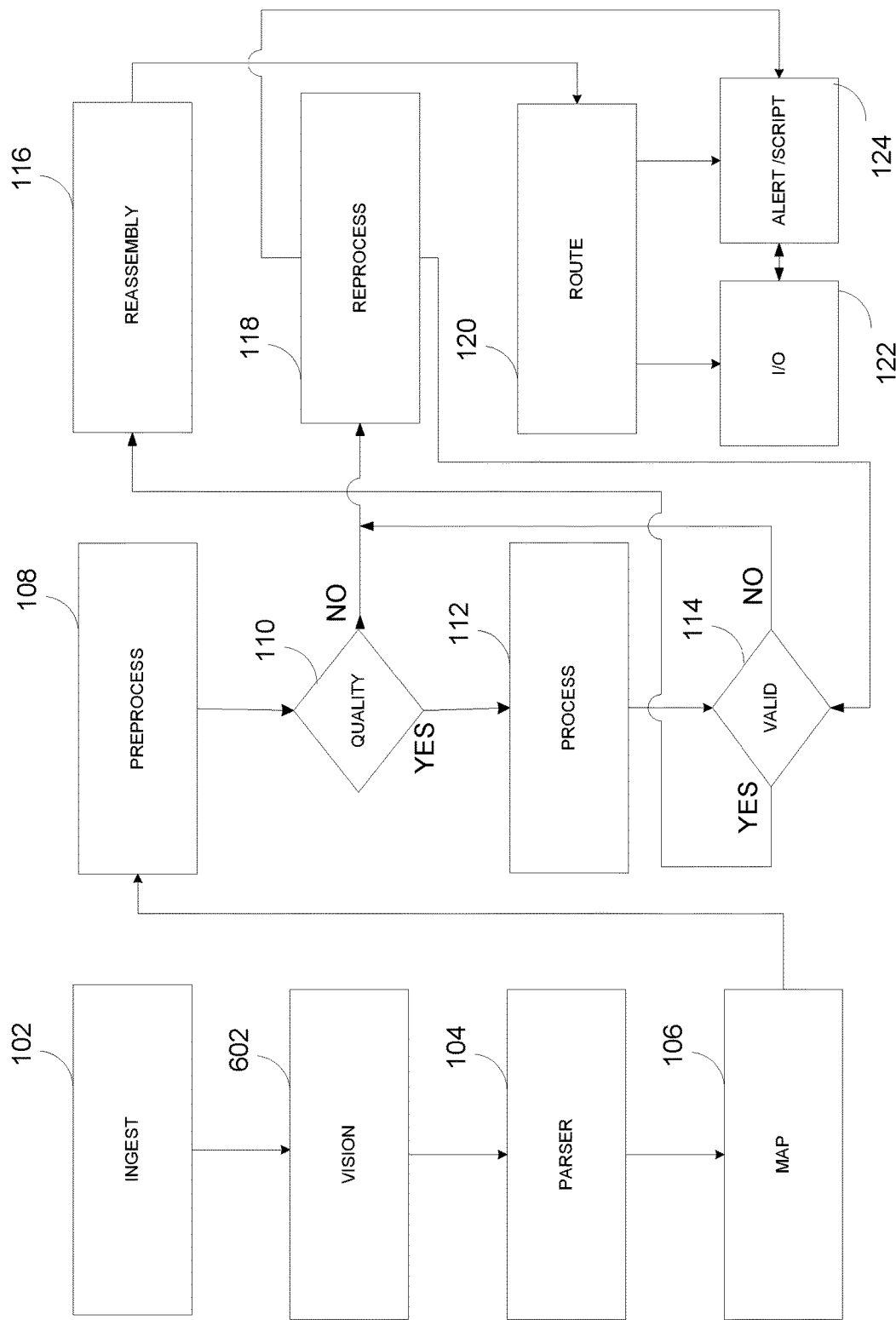
FIG. 6 is a process flow of a third processing agent.

FIG. 6 is an alternate block diagram of the processing agent process of FIG. 1. In FIG. 6, documents are received through the assessment queue and computer vision. Computer vison may stand alone, may be integrated with, or may be a unitary part of the primary nodes 202, the secondary nodes 204, the extractor 308 or any of the other modules, elements, or logic described herein. Physical objects may be identified through the computer vision engine 602 that may render an image document or a video sequence. The computer vision results may include physical object identification information, physical object position and orientation information, numerical measurement data, counts, and pre-designations classifications of physical objects, images of the physical object, and confidence values related to the physical object identification that are rendered as image documents. The remaining functions shown in FIG. 6 and their alternates function as described herein.

Figure 7:
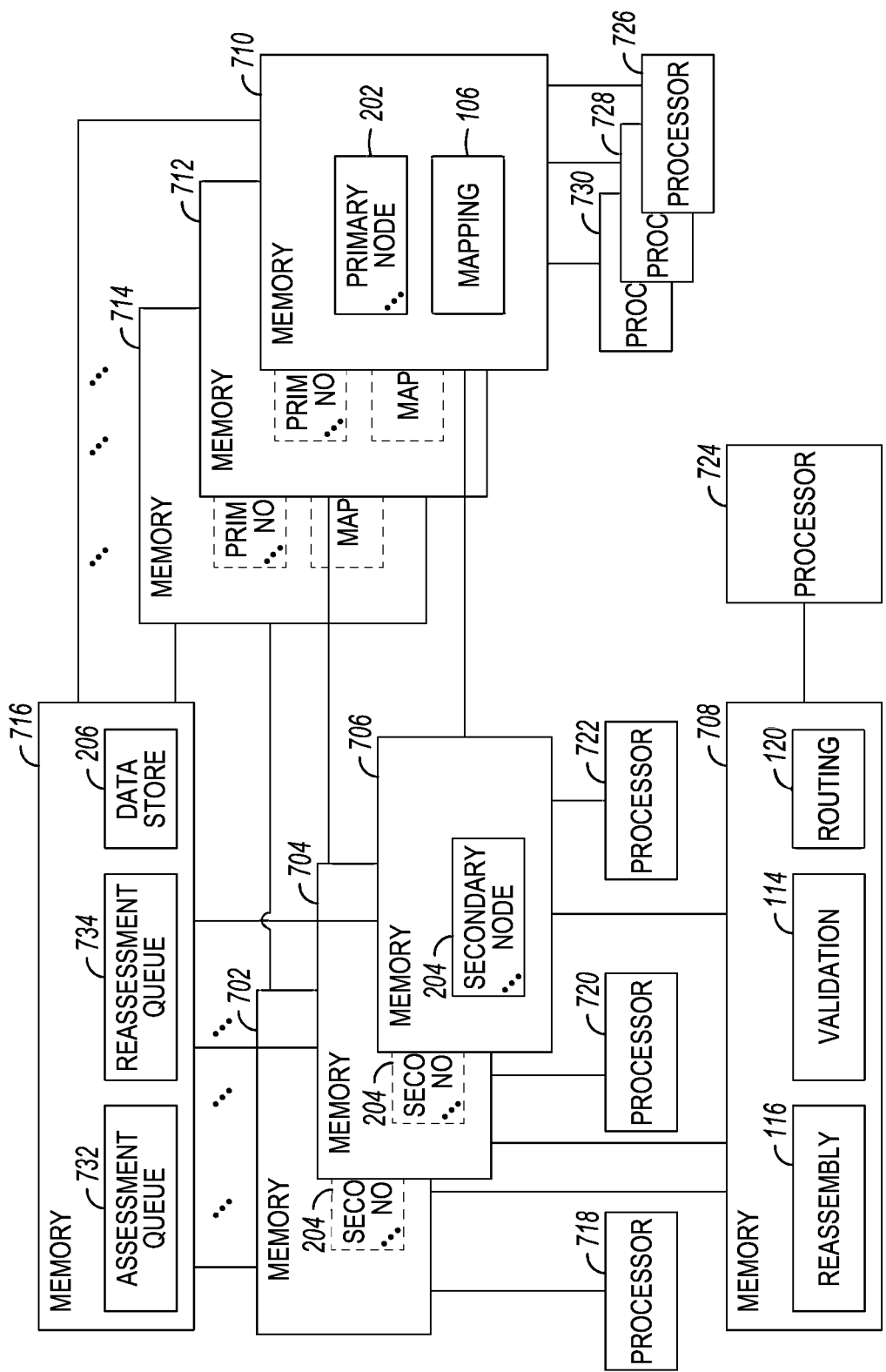
FIG. 7 is a block diagram third processing agent.

FIG. 7 is a block diagram of a third alternate block diagram of the alternate processing agent of FIG. 2. The system comprises multiple processors 718-730 (e.g., CPUs, GPUs, etc.), multiple non-transitory media 702-716 such as multiple memories (the contents of which are accessible to the processors 718-730, respectively). The memories 702-716 may store instructions which when executed by one or more of the processors 718-730, respectively, causes the systems and methods to render some or all of the functionality associated with the processing agents and some or all of the functionality described or disclosed in FIGS. 1-6 and FIGS. 8-11. For example, the memory 702-716 may store instructions which when executed by one or more of the processor 718-730, respectively, causes the system to render the functionality associated with one or more secondary nodes 204 (the symbol "·-·" shown in the secondary node blocks 204 establishes the other elements that comprise the secondary nodes 204 are hidden behind the block representation if not explicitly shown), the assessment queue 732, reassessment queue 734, the data store 206, the primary nodes 202, the reassembly logic 116, the validation logic 114, the routing logic 120, the encryption cipher 310, the learning algorithm 402, the primary nodes 202 (the symbol "·-·" shown in the primary node blocks 202 indicates the other elements that comprise the primary nodes 202 are hidden behind the block representation if not explicitly shown), the mapping logic 106, the auto index logic 320, the router tracker logic 350, the I/O APIs 122, 304 and 322, the export logic 340, the archive 360, the alert logic and scripts 124, the SQL databases 206, the sweep logic 418, the control engine, and/or functionality and logic shown in FIGS. 8-11. In addition, data structures, temporary variables, metadata and other information are stored in one or more memories 702-716.

The processors 718-730 may comprise a single processor with multiple cores or multiple processors with multiple cores, on multiple devices or distributed across more than one system that run in parallel. The processors 718-730 may be hardware that executes computer executable instructions or computer code embodied in the memory 702-716 or in other memory to perform one or more features of the disclosed system. The processors 718-730 may include a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memories 702-716 or storage disclosed may retain an ordered listing of executable instructions for implementing the functions described herein. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random-Access Memory (RAM), a Read-Only Memory (ROM), an Erasable Programmable Read-Only Memory (EPROM or Flash memory), or a database management system. The memories 702-716 may comprise a single device or multiple devices that may be disposed on one or more dedicated memory devices or on a processor or other similar device.

The memories 702-716 may also store computer code that may include instructions executable by the processor 718-730. The computer code may be written in any computer language, such as C, C++, assembly language, channel program code, and/or any combination of computer languages. The memories 702-716 may store information in data structures.

Figure 8A:
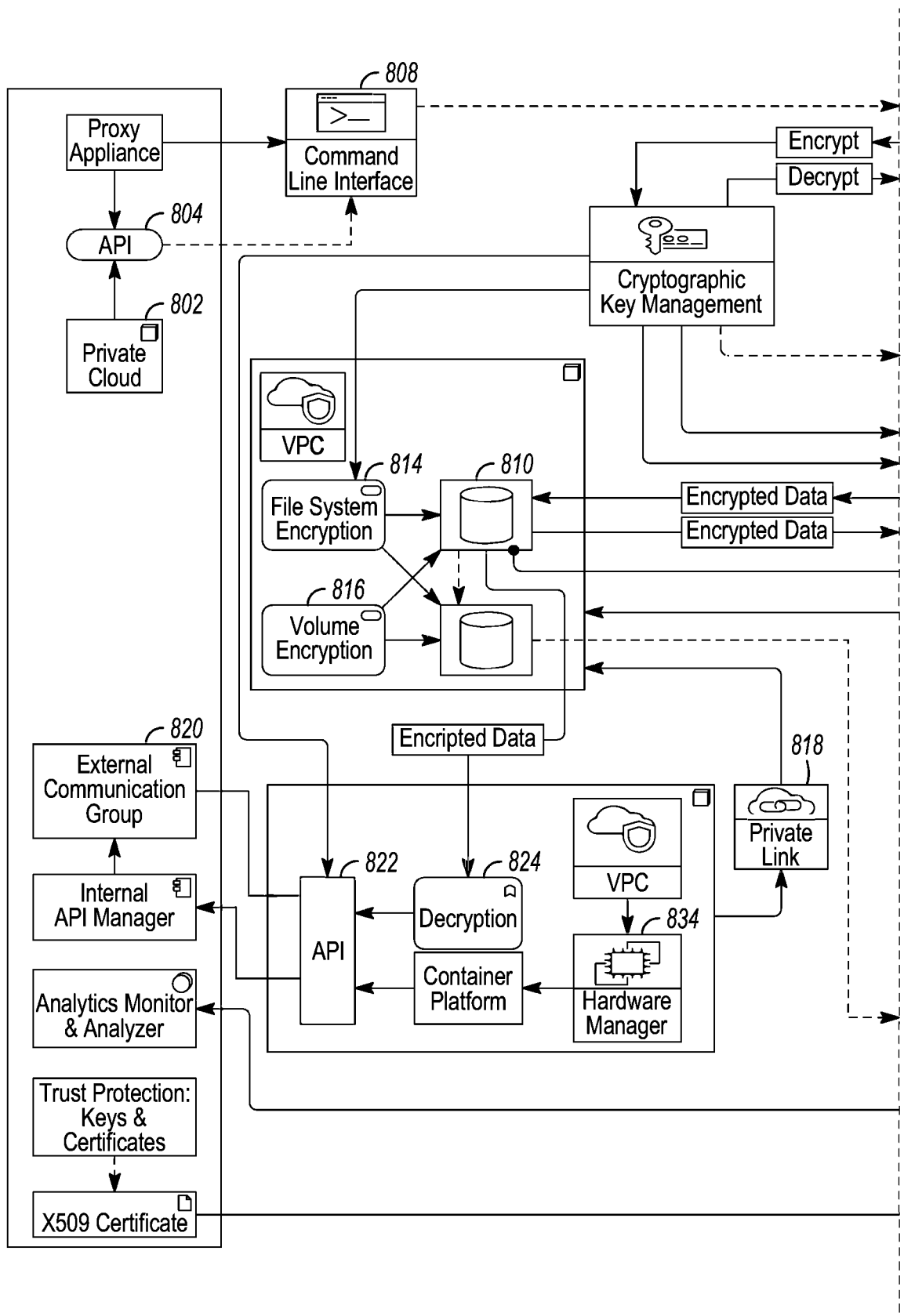
FIGS. 8A and 8B are a block diagram of an indexing agent.
Figure 8B:
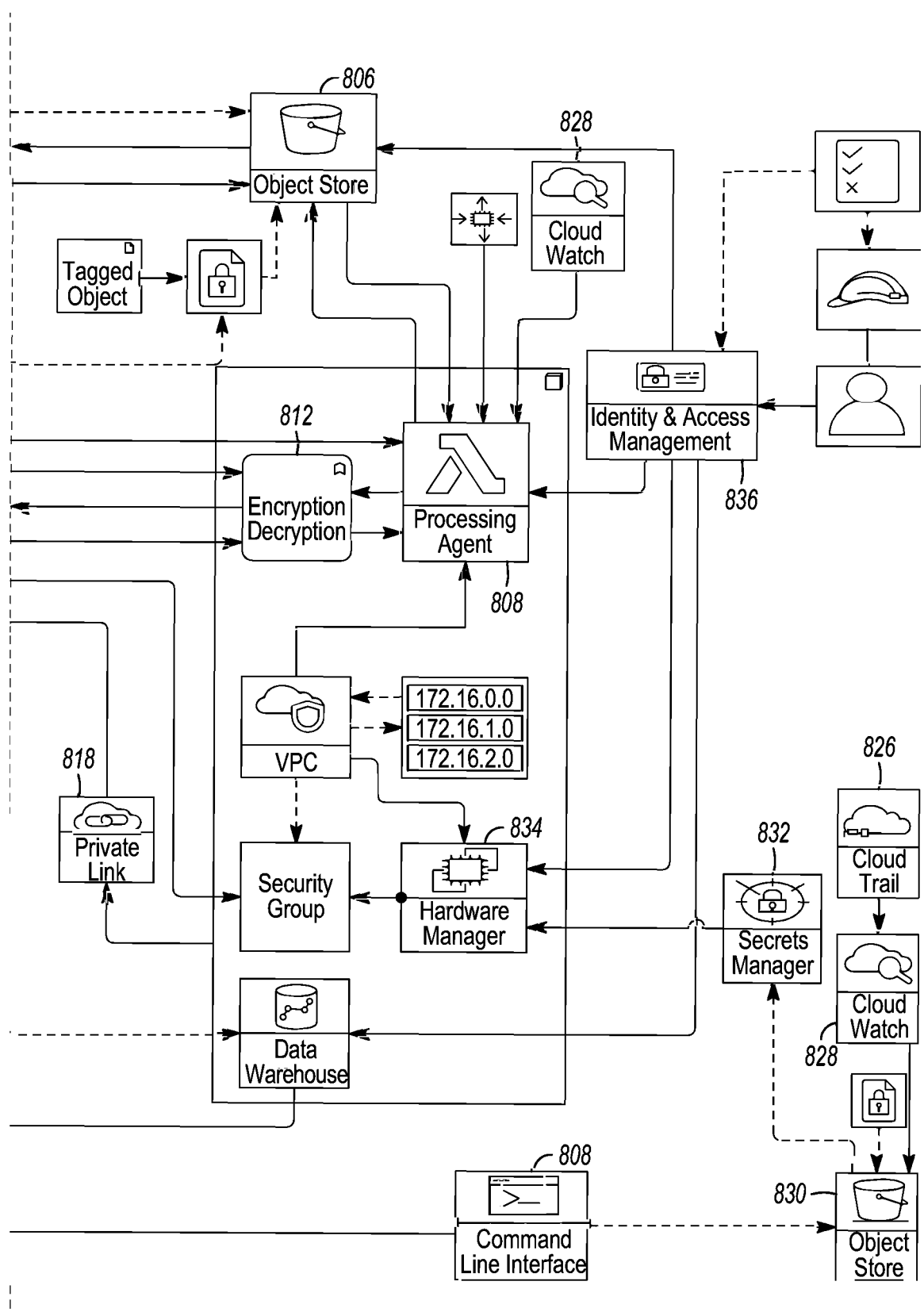

FIGS. 8A and 8B are a block diagram of an indexing system that incorporates a processing agent. The indexing system controls pools of processing, storage, and networking resources. It deploys applications on demand without waiting for human action. It is generated from a machine-readable definition file stored in a non-transitory computer media instead of dedicated pre-existing physical hardware and/or configuration tools that generate systems that describe alternative embodiments that are part of this disclosure. When infrastructure is implemented and originated by code and/or code files, for example, the infrastructure can be copied and distributed easily and efficiently. It can be generated and up and running in stages on demand.

Speed is important, particularly in real-time systems that require execution of certain processes within prescribed time periods. To meet these demands and necessary throughput levels, the systems can be generated and staged when needed with little or no latency by executing a script (e.g., a program that builds the indexing system and automation system). The indexing systems and automation system it may feed are consistent, because the configuration or definition files that create them can be precisely duplicated and traced. This capability provides trackable version control. The systems lower the cost of infrastructure, because hardware need not be dedicated to one function at the exclusion of other functions. Duplicated systems can run in parallel and simultaneously eliminate output divergence and allow traffic to be distributed across duplicate systems in parallel on demand providing a built-in-fault tolerance. The fault tolerance occurs without pre-provisioning servers or other hardware that known backup systems require.

In FIGS. 8A and 8B, the system shown as an indexing agent ingests documents sourced through a private cloud 802. An Application Programming Interface (API) 804 ingests the raw documents that are pushed through proxies into an object store 806 under the control of a command line interface 808. The object store 806 manages data as objects like other object storage and services described herein, as opposed to other storage architectures, like file systems that manage data as a file hierarchy, and block storages that manage data as blocks within sectors and tracks. The command line interface 808 manages multiple indexing services and components used by the indexing agent including the object store 806. As raw documents are stored, the system spins up a processing agent 808 that detects, splits, cleans, recognizes, classifies, validates, and tracks split, extracted, or partitioned documents as pages as described in this disclosure. In the exemplary system, the processing agent 808 is a serverless application that foregoes capacity provisioning and patching that are delegated to cloud services. The code automatically triggers cloud control that precisely allocates computing resources based on the incoming volume of raw documents and/or events to any scale of document processing traffic. Cloud services is the on-demand delivery of information technology and resources over a publicly-accessible network like the Internet and/or a virtual private network.

A group of self-healing clusters 810 comprising geographically distributed database instances store the output of the processing agent 808. The database instances prevent a single point of failure through replication and include continuous backups to provide point-in-time recovery. Point-in-time recovery restores the database from backups prior to a target time for recovery, then uses incremental backups to roll the database forward to the target time. The database instances are non-relational allowing them to store dynamic schema. Dynamic schema is dynamically configured via the database management system at run-time based on the resources it stores—here, the individual pages the systems process. The schema allows each document transaction written to the database instances to be unique to the content and structure of that processed page. In other words, the database instances are not limited to the same structure for each single page or document entry stored in the databases instances.

Three levels of self-enforcing encryption are applied in the virtual private clouds hosting the system and self-healing clusters 810. The system combines block algorithms to render a new security algorithm. The use of a triple encryption with two or three independent and different keys increase security. An exemplary cipher includes an underneath storage encryption that includes volume encryption (securing multiple files within one encrypted file volume) 816, file level encryption (encrypting specific files) 814, and field level encryption 812 (encrypting specific data fields). Thus, a user needs more than one decryption key to decipher the data fields stored in the distributed database instances. In systems in which triple encryption is not secure enough, higher multiples of encryption are used, such as quintuple encryption where some (e.g., 1, 2, 3, and/or 4) keys are independent.

Private links 818 provide connectivity between virtual private clouds serving the self-healing clusters 810 and the processing agent 808. In FIG. 8, it is the only connection in the exemplary system. The private links ensure that no traffic or data is exposed to the public or public networks and simplifies the systems architecture by making it easier to connect to other virtual clouds including the orchestration and container platform serving the classified and validated content identified by the processing agents described in the prior systems and/or the processing agent 808 shown in FIG. 8.

The output of the self-healing clusters 810 is decrypted through two or more decryption keys, some of which may be used in the container platform virtual private cloud as shown as the decryption agent 824 of FIGS. 8A and 8B. Because more than two keys are used in the exemplary system, even if an eavesdropper knows one of the decipher keys, if s/he doesn't know the third decipher key, s/he cannot read the data.

In operation, an external communication group 820 calls the front-ended API 822 hosted on the container platform hosted in a virtual private cloud. The call causes the API 822 to connect to a database instance of the self-healing clusters 810 that hold the classified pages generated by the processing agent 808. Security applications oversee the operation and maintain auditing records on all of the storage of the system. A trail module 826 continuously monitors and retains account activity related to actions across the system. It provides and stores event history to a watch module 828. The watch module 828 monitors the application and responds to system-wide performance changes, such as those that occur because of anomalous behavior, including variations detected in the processing agent 808. In some applications, the watch module 828 provides a near real-time stream of system events that describe the changes and notifications that are stored contemporaneously in an instance of the object store 830. From the stream, the system applies rules that route specific events, initiate certain functions, and/or invoke a different operating state causing a module to perform further processing. Some watch modules 828 set alarms, generate visual logs, and store metrics in the instance of the object store 830, and take automated actions in response to changes and/or anomalous detections. A secrets module 832 rotates, manages, and retrieves database credentials, API keys, and other secrets throughout the system that may be stored in object store 830. In FIGS. 8A and 8B, the secrets module 832 communicates with an instance of an elastic hardware cloud manager 834 that scales up and down the hardware servicing the indexing agent and reduces the need to forecast document traffic, such as the traffic processed in the virtual private clouds serving the processing agent 808 and container platform. An identity and access management module 836 enables access to services and resources of the indexing agent. The identity and access management module 836 creates and manages users and groups, and uses permissions to allow and deny access to the indexing agent's resources.

Figure 10A:
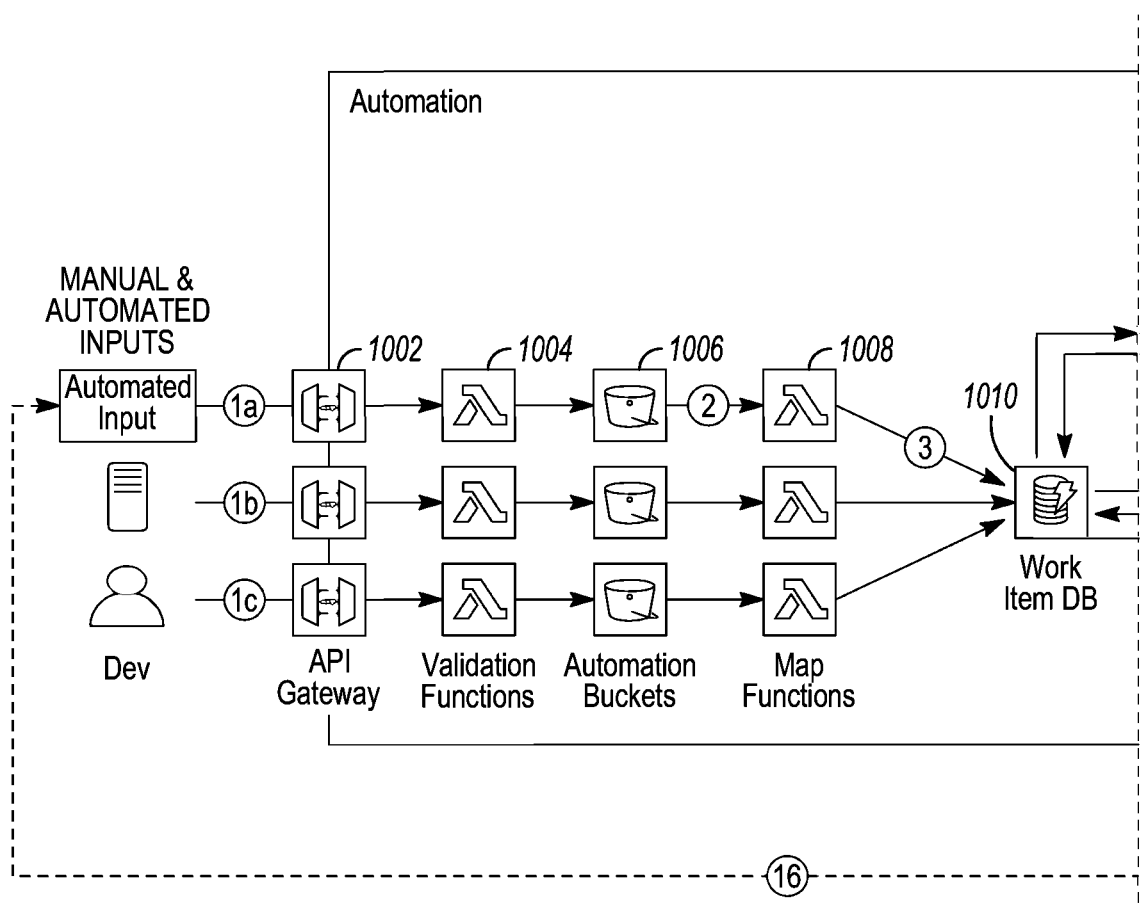
FIGS. 10A and 10B are a block diagram of an automation system.
Figure 10B:
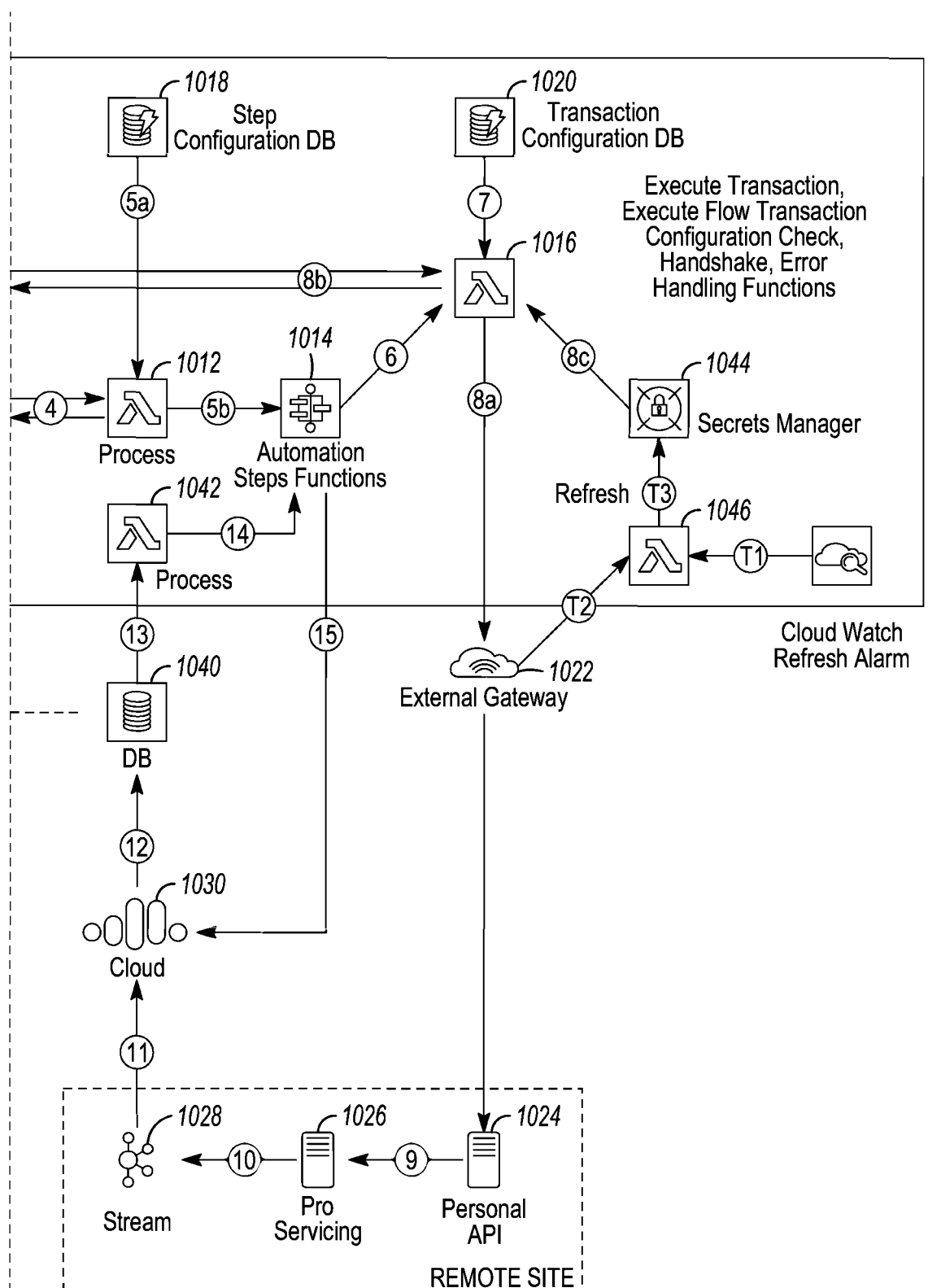

Like FIGS. 8A and 8B, the automation system shown in FIGS. 10A and 10B is generated from machine-readable definition file, rather than from dedicated pre-existing physical hardware that comprise alternate embodiments in this disclosure. The system shown as a policy automation agent uses computer vision and machine learning modules to detect and identify objects, ancillary markings and intrusions on documents, and non-compliances. In an insurance context processing an uninsured motorist form, for example, the computer vision and machine learning modules know the structure of the form (e.g., the page) that comprises one or more split or partitioned pages. The computer vision and machine learning modules detect and recognize the presence or absence of required fields, such as an insurance policy number, selected and unselected check boxes, and the presence or absence of a signature (e.g., a handwritten cursive or typed signature) and/or a date associated with that signature, as shown in an exemplary executed form of FIGS. 9A and 9B that may be rendered from the templates shown in FIGS. 12-14. By applying a core functionality module and an image processing module that access a computer vision library, the system detects desired and ancillary data-structures, objects, and images from which the computer vision and machine learning modules (e.g., that may comprise the computer vision engine 602) to determine whether a page or pages are valid and if they contain extraneous information. If the page or pages are invalid or contain extraneous information, for example, such as additional writings, the designation sets a flag that rejects the page and triggers the transmission of a message to the client or sender that includes reasons why the page or pages (e.g., the form) were rejected; and in some instances, requests a correction and/or resubmission before a processing resumes. If the page or pages are determined to be valid, the page or pages pass through an API 1002 gateway that initiates a series of functions that are part of an automation system, such as an exemplary policy automation system shown in FIGS. 10A and 10B.

A validation module 1004 extracts the recognized data passed from the computer vision and machine learning modules to a serverless computer service validation module 1004 that validates the data (assures the accuracy of the data) and stores the validated data in a secure object storage module or service 1006. The secure object storage module or service 1006 protects and stores the data asynchronously. Three instances of secure object storage services are used (shown as buckets) to store objects received from three different input sources in FIGS. 10A and 10B. The sources include a processing agent 808, developers, and other sources. A mapping module 1008 further verifies the information by mapping fields to work item data sets that are stored in a serverless key-value and document database instance 1010 that has built-in security, backup and restore capabilities, and in-memory caching. The document database organize documents into groups called collections, which are analogous to the tables in relational databases. The key-value database is a NoSQL database that stores all key-value pairs together in a single namespace, which is analogous to a relational schema.

In FIGS. 10A and 10B, a policy processing agent 1016 runs one or a series of processes, such processes that update insurance policies, for example, orchestrated by a step-function orchestrator 1014 accessible through a visual interface (not shown) and programmed through a NoSQL database instance 1018 access. Another NoSQL database instance 1020 stores transaction configurations. The step-function orchestrator 1014 creates and runs a series of checkpointed and event-driven workflows that maintain the policy application state in response to content delivered via an external subscription by the external-publish-subscribe system 1030, data retained in the key-value and document database instance 1010, and data retained in a database instance of the self-healing clusters 1040. Checkpointing provides fault tolerance for saving a snapshot of the application's state of the self-healing clusters 1040 so that policy processing agent 1016 can restart from that step when a failure occurs. Each step executes in order, as defined by insurance policy update workflows, in this exemplary system. Further, the output of each step is an input to the next. A policy process module 1012 verifies the data sourced by the key-value and document database instance 1010 (e.g., name of the insured, insurance policy number, etc.) and verifies that the steps orchestrated by the step-function orchestrator 1014. Verifications are assured through access to a NoSQL database instance 1018 that stores and retrieves the step configurations.

In an exemplary use case in an insurance context, a call is made into a personal lines API 1024 that verifies an outstanding fulfillment on an existing insurance policy. Once the fulfillment is verified, the system transmits a form that is returned and processed by the indexing system described herein. If the form relates to changing bodily injury limits on an uninsured motorist's (UM) personal coverage, for example, the detected, classified, validated, and embedded metadata pages rendered by the indexing system are processed by API 1002, the validation module 1004, stored in the secure object storage module or service 1006, processed by the mapping module 1008 and stored in the secure object storage module or service 1010. The policy processing agent 1016 runs one or a series of processes that updates (e.g., changes or modifies) the bodily injury limits (aka, e.g., stack limits) that are part of the insurance policy by a bodily injury workflow that updates the limits associated with the insurance policy, orchestrated by the step-function orchestrator 1014 and the NoSQL database instance 1018. With the policy limits of the insurance updated and/or changed, the policy processing agent 1016 transmits the updates/changes to a personal line API 1024 and a servicing system or agent 1026 through an external gateway 1022. The external gateway 1022 connects the networks using different communication protocols so that processed pages and updates can be passed between the networks.

An internal publish-subscribe system 1028 accessed through the servicing system or agent 1026 publishes events associated with policy limit change objects in this exemplary use case. Subscribers, including an external publish-subscribe system 1030, access the internal publish events though an API. The subscribers receive notifications (e.g., such as the creation, modification and deletion of publish-subscribe objects) and retrieve details of the events—in this example, the change in stack limits, using a shared API interface.

The external publish-subscribe system 1030 publishes events associated with one or more policy change objects or files, subscribed among others by the external communication group 820. The external publish-subscribe objects may be accessed through file system software implemented by applications, libraries, and/or an operating system. The publish-subscribe objects comprise an identifier, such as an insurance policy identifier and one or more attributes, such as the changes in the stack limits described above in this example. The internal and external publish-subscribe files described herein and some or all of the associated objects may persist over system restarts and failures of the computing platform hosting the internal and external publish-subscribe systems 1030 and 1040, and may be retained in a persistent file system and/or a non-volatile medium. In FIGS. 10A and 10B, a database instance of the self-healing clusters 1040 subscribes and stores the changes to the injury bodily limits classified pages processed by the policy processing agent 1016. The storage triggers the transmission of a confirmation to the client or party requesting the change, and makes available processed feedback relating to the change to the step-function orchestrator 1014 through the policy feedback module 1042. Further, the documents associated with the change are routed back to the indexing agent through a subscription serviced by the external publish-subscribe system 1030 where the documents are wrapped around the insurance policy document. The documents are stored in the self-healing clusters 810 with a designation that they were auto processed.

Changes or processing made through the automation system of FIGS. 10A and 10B occur when they are authorized and authenticated. In FIGS. 10A and 10B, access tokens ensure the appropriate resources are authorized to execute the function or workflows, such as changes in the exemplary stack limits described above. When a request is serviced by policy processing agent 1016, the authorization module 1046 pulls an access token through the external gateway 1022 asynchronously. In some systems, the access token is received with an off-line access object that defines the scope of a continued access once the access token expires through one or more authorization codes. Access tokens have a limited life to reduce the amount of time an attacker might misappropriate a token and reduce the likelihood that information contained in, referenced by, or associated with the access token becomes stale. Should an access token expire or become invalid before the processing agent 1016 completes an authorized function or workflow, the secrets manager 1044 may access an authorization code that provides access to a new token or refreshes the access token without resoliciting consent from the requestor that would flow through the external gateway 1022. If the processing agent's 1016 executions fall within the scope or within the exceptions allowed by an off-line access object associated with the authorization code, the secrets manager 1044 enables the processing agent 1016 to complete its function or workflow or continues processing for a prescribed period of time without requesting an additional authorization through the subsequent access or refreshed access token. When access tokens or refreshed access tokens expire, become invalid, or are not refreshed, the policy processing agent 1016 execution ends.

FIGS. 11A and 11B are an exemplary fourth processing agent that interfaces an exemplary automation system. Documents are received through assessment queues 1102 that are controlled or respond to a command line interface 1104 that allow systems and users to manage the processing agent 808. The documents are stored in an object storage or storage service 1106 et al. (referred to as 1106) that can be hosted in multiple locations. The object storage or storage service blocks public access to the objects at the bucket and account level that allows the system to be compliant with state regulatory requirements. A parser 1108 removes the original metadata appended to the documents and rips, splits, or extracts pages from documents rendering smaller pages, with each ripped page representing no more than a physical page that are stored as a file in object storage or storage service 1106 by the parser API 1110. To improve character recognition, a cleaning module 1112 sharpens text, straightens images (e.g., deskew), applies one or more descreen filters that remove artifacts, and/or removes the backgrounds that is then stored in the object storage or storage service 1106 by the cleaning module 1114. The cleaning module improves textual and character matching executed by a character and object recognition module or service 1116 that stores the alphanumeric characters, punctuation marks, and other objects that the shapes represent in the object storage or storage service 1106 by a Recognizer API 1118. One or more machine learning algorithms (MLA) designate pages into classes or categories of documents through rules, decision trees, etc., that process the recognition vector through a classifier 1120. The MLA or MLAs process recognition vectors based on features that either classify the pages or predict the document types to which the recognition vector belongs. When the characteristics of the recognized vector are classified by the MLA(s) and optional deterministic rules that execute comparisons between recognized and predetermined words and/or phrases, the document type classification is generated and embedded or mapped into the page and/or metadata thereafter associated with the page. The classified pages are then stored as the classified pages in the object storage or storage service 1106 by the classifier API 1122. With the pages classified, a rules engine 1126 triggers a workflow and/or an automation system, such as the automation system shown in FIGS. 10A and 10B and described above. The rules engine 1126 evaluates the classified pages and elevates or spins up the selected automation system or systems and delivers the classified pages based on pre-designated rules through a processing agent API 1124. A rule can apply to classified pages received from one or many devices, take one or many actions in parallel, and route and deliver the pages to one or multiple destinations.

The functions, acts or tasks illustrated in the figures or described may be executed in response to one or more sets of logic or instructions stored in or on non-transitory computer readable media as well. The functions, acts or tasks are independent of the particular type of instructions set, storage media, or processor or processing strategy and may be performed by software, hardware, integrated circuits, firmware, micro code and the like, operating alone or in combination. In one embodiment, the instructions are stored on a removable non-transient media device accessible to a remote machine. In other embodiments, the logic or instructions are stored in a remote location for transfer through a computer networks or over wireless or tangible communication lines. In yet other embodiments, the logic or instructions may be stored and executed by multiple GPU servers.

While each of the agents and/or processing agents shown and described herein operate automatically and operate independently, they also may be encompassed within other systems and methods and execute any number "n" of iterations of some or all of the process used to enhance documents, recognize pages, render classification, route to destinations, and modify, update, and/or change any field of a form including any option covered by an insurance policy (e.g., including but not limited to bodily injury liability, personal injury protection, property damage liability, collision, comprehensive, uninsured/underinsured motorist, dwelling coverage, other structures coverage, personal property coverage, loss-of-use coverage, personal liability coverage, medical payments coverage, any insurance coverages, etc.). Alternate processing agents may include any combinations of structure and functions described or shown in one or more of the FIGS. These systems are formed from any combination of structures and functions described herein. The structures and functions may process additional or different input. For example, alternate MLAs may perform classification based on a contextual analysis too. By including contexts in the training of the machine learning algorithm, the machine learning algorithm's automatic classifications are not limited to the processing of recognition vector to decision trees trained only on word and phrase combinations. This context-based training constitutes an improvement over traditional training as the machine learning algorithms are also based on users' intentions reflected in contexts expressed in the documents (via recognizing holistic context-sensitive exchanges by considering statements that surround a word or passage), rather than being based exclusively on isolated word and phrase input. The inclusion of sub-textual analysis in the machine algorithm's training enables a more flexible, nuanced, and accurate classification that can easily be tailored to the processing agent's applications.

Consider content that includes the term "comprehensive" in multiple pages. In these exemplary pages, the machine learning algorithm concludes that the user has demonstrated an unfamiliarity with insurance based on the user's failure to provide responses to common insurance questions rendered on the form. In viewing the context, the predetermined number of unanswered questions, the information provided on the document indicate that document is not from a customer of the insurance carrier (e.g., confirmed via a credential verification), and the use of the term "comprehensive" in the document, the machine learning algorithm associates and clarifies these contexts as pages requesting a bundled insurance quote.

If a machine learning algorithm were trained on the term "comprehensive" alone, without context, and specifically with respect to automobiles, the term "comprehensive" would be understood to refer to one of three insurance coverages. The two other coverages are liability and collision. Collision coverage covers damage to vehicles following a collision, and Comprehensive coverage covers damage to vehicles caused by anything other than a collision (such as damage from fire, vandalism or failing objects like a tree or hail). While a recognition of the input alone would mistakenly classify the document as a request for insurance policy servicing that should be routed to an insurance policy servicing destination, by including contexts and contextual associations in the machine learning algorithm training, the machine learning algorithm automatically classifies the pages as a document related to an insurance quote.

In yet another alternative processing agent, a detection system accurately detects anomalies in classified documents, and in response issues alerts or requests for supplemental information by transmitting request for clarifications via email or serving a URL. In some applications, when a predetermined number of unsolicited messages are asynchronously transmitted to many recipients, the machine learning algorithm also can classify the pages as spam and cause the computer system via an alert or script to block the documents due to the large number of similar messages received. The term spam refers to sending the same message indiscriminately to (large numbers of recipients).

The term "machine learning" refers to devices or machines that execute machine learning algorithms which use processing units for character recognition. Some machine learning devices represent concepts in multiple hierarchical fashion with corresponds to various levels of abstraction. The term "coupled," disclosed in this description may encompass both direct and indirect coupling. Thus, a first and a second element are said to be coupled when they communicate directly with one another, as well as when the first element communicates through an intermediate component, which is connected directly or via one or more additional intermediate components to a second element. The term "substantially" or "about" may encompass a range that is largely, but not necessarily wholly, what is specified. It encompasses all but an insignificant amount, such as a variance within a range of five or ten percent of the given value of example. When devices are responsive to commands events, and/or requests, the actions and/or steps of the devices, such as the operations that devices are performing, necessarily occur as a direct or an indirect result of the preceding commands, events, actions, and/or requests. In other words, the operations occur as a result of the preceding operations. A device that is responsive to another requires more than an action (i.e., the device's response to) merely follow another action.

Alternate systems are not limited to the particular hardware and/or process described above. The systems illustratively disclosed herein suitably may be practiced in the absence of any element (including hardware, software and/or processes), which is not specifically disclosed or described herein. They may operate in the absence of those elements. Further, the various elements and processes described in each of the many systems and processes described herein is regarded as divisible with regard to the individual elements described, rather than inseparable as a whole. In other words, alternate systems encompass any variation and combinations of elements described herein and may be made or used without the various elements described (e.g., they may operate in the absence of or devoid of one or more of the disclosed elements). This means that any of the element or elements described herein are excluded from the scope of the embodiments in alternate systems and/or processes.

A processing agent translates and expedites content delivery of physical and virtual documents. The physical and virtual documents include documents or pages that contain unstructured data that either does not have a predefined data model or is not organized in a pre-defined manner. An end-to-end learning system learns contexts and uses its contextual knowledge to efficiently route documents to destinations. A detection system accurately detects anomalies, and in some applications, protects backend systems from unsolicited messages asynchronously transmitted to many recipients. An automated job separation system parses documents by breaking or splitting documents into pages so that only desired pages are routed to apt destinations. The job separation system enables multiple documents to be processed simultaneously without job separation sheets.

Some processing agents include an export API that transmits documents in any desired format to a folder, an address, destination, and/or a subsequent process. Some systems transmit commands that enable scripts. Scripts may request information from remote sources, generate and transmit forms to users, notify users of outcomes, issue audible or visual alerts to sources or users that signal an error, missing information, represent a warning, and/or spin up the serverless automation described. Some document processing agents execute data compressions that reduces memory and bandwidth use. The document processing agents execute across multiple nodes allowing the processing agents to distribute jobs across local and/or remote computing resources.

The subject-matter of the disclosure may also relate, among others, to the following aspects (referenced by numbers):

1. A method of classifying documents having insurance data, the method comprising:
    accessing a plurality of documents in an assessment queue stored in a memory of a device; each of the plurality of documents comprising pages having a predefined destination stored in metadata associated with each document;
    removing the metadata associated with each document;
    converting the plurality of documents into a plurality of single physical page documents by splitting each of the plurality of documents into a plurality of files consisting essentially of no more than a single physical page;
    converting each of the plurality of files into separate recognition vectors that represent information conveyed in each of the single physical pages;
    classifying the plurality of files through an additive learning algorithm in which routing data is embedded in second metadata associated with each of the plurality of files;
    merging the classified plurality of files in response to a plurality of rules based at least in part on the second metadata;
    routing the merged documents to a remote destination independent of the predefined destination stored in the metadata; and
    processing an insurance parameter automatically in response to the routing of the merged documents through an orchestrator that executed a check-pointed event-driven workflow that maintains an application state.
2. The method of aspect 1 where the plurality of documents comprise email or other digital content.
3. The method of any of aspect 1 to 2 where the method is executed from a machine-readable definition file stored in a non-transitory computer media.
4. The method of any of aspect 1 to 3 further comprising distributing the single physical pages across a plurality of cloud servers.
5. The method of any of aspect 1 to 4 further comprising a computer vision module and a machine learning module that detect and identify the absence of a requirement including a handwritten cursive signature.
6. The method of any of aspect 1 to 5 further comprising applying a weighting to scalar variables that comprise the recognition vectors based on an active grammar or a predefined document type.
7. The method of aspect of any of aspect 1 to 6 where the additive learning algorithm comprises a decision tree.
8. The method of aspect 7 where the decision tree comprises a boosted decision tree.
9. The method of aspect 7 where the time required to train the additive learning algorithm is proportional to a number of splits executed on the decision tree.
10. The method of aspect 7 where the decision tree is trained on a contextual association between words or phrases.
11. The method of any of aspect 1 to 10 further comprising causing the files to undergo a data compression.
12. The method of any of aspect 1 to 11 where the merging of the files is based on at least one Boolean function.
13. The method of any of aspect 1 to 12 where the plurality of rules is stored in individual profiles in a memory which determine when the merging occurs, where the merging occurs, or how the merging occurs.
14. The method of any of aspect 1 to 13 where the plurality of rules is stored in individual profiles in a memory which determine computer file formats that the merging occurred or how the merged documents are compressed or mediums distribute the merged documents.
15. The method of any of aspect 1 to 14 further comprising causing an issuance of a warning or an alert in response to the classification.
16. The method of any of aspect 1 to 15 further comprising initiating a script in response to the classification.
17. A non-transitory machine-readable medium encoded with machine-executable instructions for classifying documents having insurance data, where execution of the machine-executable instructions is for:
    accessing a plurality of documents in an assessment queue stored in a memory of a device; each of the plurality of documents comprising pages having a predefined destination stored metadata associated with each document;
    removing the metadata associated with each document;
    converting the plurality of documents into a plurality of single physical page documents by splitting each of the plurality of documents into a plurality of files consisting essentially of no more than a single physical page;
    converting each of the plurality of files into separate recognition vectors that represent information conveyed in each of the single physical pages;
    classifying the plurality of files through an additive learning algorithm in which routing data is embedded in second metadata associated with each of the plurality of files;
    merging the classified plurality of files in response to a plurality of rules based at least in part on the second metadata;
    routing the merged documents to a remote destination independent of the predefined destination stored in the metadata; and
    processing a parameter automatically in response to the routing of the merged documents through an orchestrator that executed a check-pointed event-driven workflow that maintains an application state.
18. The non-transitory machine-readable medium of aspect 17 where the plurality of documents comprises email or other digital content.
19. The non-transitory machine-readable medium of any of aspect 17 to 18 further comprising distributing the single physical pages across a plurality of cloud servers.
20. The non-transitory machine-readable medium of any of aspect 17 to 19 further comprising applying a weighting to scalar variables that comprise the recognition vectors based on an active grammar or a predefined document type.
21. The non-transitory machine-readable medium of any of aspect 17 to 20 where the additive learning algorithm comprises a decision tree.
22. The non-transitory machine-readable medium of aspect 21 where the decision tree is a boosted decision tree.

23. The non-transitory machine-readable medium of aspect 22 where the time required to train the additive learning algorithm is proportional to a number of splits executed on the decision tree.

24. The non-transitory machine-readable medium of aspect 23 where the decision tree is trained on contextual associations between words or phrases.

25. The non-transitory machine-readable medium of any of aspect 17 to 24 further comprising causing the partitioned documents to undergo a triple encryption.

26. The non-transitory machine-readable medium of any of aspect 17 to 25 where the merging of the is based on at least one Boolean operator.

27. The non-transitory machine-readable medium of any of aspect 17 to 26 where the plurality of rules is stored in individual profiles in a memory, which determine when the merging occurs or where the merging occurs or how the merging occurs.

28. The non-transitory machine-readable medium of any of aspect 17 to 27 where the processing occurs in response to a refreshed access token authorized by an off-line object.

29. The non-transitory machine-readable medium of any of aspect 17 to 28 further comprising a publishing event associated with the processing of the parameter through an internal publish-subscribe system that persists over a systems restart.

30. The non-transitory machine-readable medium of any of aspect 17 to 29 further comprising a publishing event associated with a processing the parameter through an external publish-subscribe system that subscribes to the internal publish-subscribe system which persists over a systems restart.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A method of classifying documents having insurance data, the method comprising:
    spinning up a remote serverless application in a system as a result of storing a raw document in a local memory remote from a device; the remote serverless application enables:
    accessing a plurality of documents in an assessment queue stored in a memory of a device; each of the plurality of documents comprising pages having a predefined destination stored in metadata associated with each document;
    removing the metadata associated with each document;
    converting the plurality of documents into a plurality of single physical page documents by splitting each of the plurality of documents into a plurality of files consisting essentially of a single physical page;
    converting each of the plurality of files into separate recognition vectors that represent information conveyed in each of the single physical pages;
    receiving an access token asynchronously, the access token being valid for a time period and issued by an off-line access object, the access token being pulled from the off-line access object through an external gateway to authorize a processing agent that enables a workflow:
    classifying the plurality of files through an additive learning algorithm in which routing data is embedded in second metadata associated with each of the plurality of files while the access token is valid and unexpired;
    merging the classified plurality of files in response to a plurality of rules based at least in part on the second metadata while the access token is valid and unexpired;
    routing merged documents to a remote destination independent of the predefined destination stored in the metadata while the access token is valid and unexpired; and
    processing an insurance parameter automatically in response to the routing of the merged documents through an orchestrator, while the access token is valid and unexpired, that executes a check-pointed event-driven workflow that maintains an application state; and
    generating a refreshed access token by refreshing the access token when the access token expires or becomes invalid without resoliciting an authorization from the off-line access object; the refreshed access token authorizing the processing agent to complete a function and the workflow; and
    terminating the processing agent's execution of the function and the workflow when the refreshed access token expires or becomes invalid;
    where a plurality of computing resources execute the remote serverless application and the plurality of computing resources are dynamically allocated based on a volume of the raw document.

2. The method of claim 1 further comprising refreshing the access token when the access token expires or becomes invalid without resoliciting an authorization from a remote object where the plurality of documents comprise email or other digital content.

3. The method of claim 1 where the method is executed from a machine-readable definition file stored in a non-transitory computer media.

4. The method of claim 1 further comprising distributing the single physical pages across a plurality of cloud servers.

5. The method of claim 1 further comprising a computer vision module and a machine learning module that detect and identify the absence of a requirement, including a handwritten cursive signature.

6. The method of claim 1 further comprising applying a weighting to scalar variables that comprise the recognition vectors based on an active grammar or a predefined document type.

7. The method of claim 1 where the additive learning algorithm comprises a decision tree.

8. The method of claim 7 where the decision tree comprises a boosted decision tree.

9. The method of claim 7 where a time required to train the additive learning algorithm is proportional to a number of splits executed on the decision tree.

10. The method of claim 7 where the decision tree is trained on a contextual association between words or phrases.

11. The method of claim 1 further comprising causing the files to undergo a data compression.

12. The method of claim 1 where the merging of the files is based on at least one Boolean function.

13. The method of claim 1 where the plurality of rules is stored in individual profiles in a memory which determine when the merging occurs, where the merging occurs, or how the merging occurs.

14. The method of claim 1 where the plurality of rules is stored in individual profiles in a memory which determines computer file formats or how the merged documents are compressed or mediums distribute the merged documents.

15. The method of claim 1 further comprising causing an issuance of a warning or an alert in response to the classification.

16. The method of claim 1 further comprising initiating a script in response to the classification.

17. A non-transitory machine-readable medium encoded with machine-executable instructions for classifying documents having data, where execution of the machine-executable instructions is for:
   spinning up a remote serverless application in a system as a result of storing a raw document in a local memory remote from a device; the remote serverless application enables:
   accessing a plurality of documents in an assessment queue accessed from the local memory and stored in a memory of the device; each of the plurality of documents comprising pages having a predefined destination stored in metadata associated with each document;
   removing the metadata associated with each document;
   converting the plurality of documents into a plurality of single physical page documents by splitting each of the plurality of documents into a plurality of files consisting essentially of a single physical page;
   converting each of the plurality of files into separate recognition vectors that represent information conveyed in each of the single physical pages;
   receiving an access token asynchronously, the access token being valid for a time period and issued by an off-line access object, the access token being pulled from the off-line access object through an external gateway to authorize a processing agent that enables a workflow:
   classifying the plurality of files through an additive learning algorithm in which routing data is embedded in second metadata associated with each of the plurality of files while the access token is valid and unexpired;
   merging the classified plurality of files in response to a plurality of rules based at least in part on the second metadata while the access token is valid and unexpired;
   routing merged documents to a remote destination independent of the predefined destination stored in the metadata while the access token is valid and unexpired; and
   processing a parameter automatically in response to the routing of the merged documents through an orchestrator, while the access token is valid and unexpired, that executed a check-pointed event-driven workflow that maintains an application state;
   generating a refreshed access token by refreshing the access token when the access token expires or becomes invalid without resoliciting an authorization from the off-line access object; the refreshed access token authorizing the processing agent to complete a function and the workflow; and
   terminating the processing agent's execution of the function and the workflow when the refreshed access token expires or becomes invalid;
   where a plurality of computing resources execute the remote serverless application and the plurality of computing resources are dynamically allocated based on a volume of the raw document.

18. The non-transitory machine-readable medium of claim 17 where the additive learning algorithm comprises a plurality of learning models that are combined to generate a summed output, and interfaces a successive learning model separated from the additive learning model that minimizes a plurality of residuals generated from a preceding learning model.

19. The non-transitory machine-readable medium of claim 17 further comprising distributing the single physical pages across a plurality of cloud servers.

20. The non-transitory machine-readable medium of claim 17 further comprising applying a weighting to scalar variables that comprise the recognition vectors based on an active grammar or a predefined document type.

21. The non-transitory machine-readable medium of claim 17 where the additive learning algorithm comprises a decision tree.

22. The non-transitory machine-readable medium of claim 21 where the decision tree is a boosted decision tree.

23. The non-transitory machine-readable medium of claim 22 where a time required to train the additive learning algorithm is proportional to a number of splits executed on the decision tree.

24. The non-transitory machine-readable medium of claim 23 where the decision tree is trained on contextual associations between words or phrases.

25. The non-transitory machine-readable medium of claim 17 further comprising causing the plurality of files to undergo a triple encryption.

26. The non-transitory machine-readable medium of claim 17 where the merging of the is based on at least one Boolean operator.

27. The non-transitory machine-readable medium of claim 17 where the plurality of rules is stored in individual profiles in a memory, which determine when the merging occurs or where the merging occurs or how the merging occurs.

28. The non-transitory machine-readable medium of claim 17 where the processing occurs in response to the access token being authorized for a prescribed period of time by the off-line object and the access token being reauthorized.

29. The non-transitory machine-readable medium of claim 17 further comprising a publishing event associated with the processing the parameter through an internal publish-subscribe system that persists over a systems restart.

30. The non-transitory machine-readable medium of claim 17 further comprising a publishing event associated with the processing the parameter through an external publish-subscribe system that subscribes to an internal publish-subscribe system which persists over a systems restart.

* * * * *